US011774376B2

(12) United States Patent
Fukushima et al.

(10) Patent No.: US 11,774,376 B2
(45) Date of Patent: Oct. 3, 2023

(54) POWER SUPPLY UNIT AND RADIATION IMAGING APPARATUS INCLUDING THE SAME

(71) Applicant: CANON KABUSHIKI KAISHA, Tokyo (JP)

(72) Inventors: Takashi Fukushima, Kanagawa (JP); Masataka Suzuki, Kanagawa (JP); Riku Egawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 17/131,084

(22) Filed: Dec. 22, 2020

(65) Prior Publication Data

US 2021/0199602 A1 Jul. 1, 2021

(30) Foreign Application Priority Data

Dec. 26, 2019 (JP) .................................. 2019-236296
Dec. 26, 2019 (JP) .................................. 2019-236302
Dec. 26, 2019 (JP) .................................. 2019-236389

(51) Int. Cl.
*G01N 23/04* (2018.01)
*G01T 1/175* (2006.01)

(52) U.S. Cl.
CPC .............. *G01N 23/04* (2013.01); *G01T 1/175* (2013.01)

(58) Field of Classification Search
CPC ........... G01N 23/04; G01T 1/175; G01T 1/20; G01T 1/2928; H01G 11/78; H01G 11/12; A61B 6/56
See application file for complete search history.

(56) References Cited

U.S. PATENT DOCUMENTS

| 2,620,394 | A | * | 12/1952 | Valensi | ............... | H04L 25/4902 235/61 PK |
| 2,701,764 | A | * | 2/1955 | Carlson | .................. | G03G 15/30 347/112 |
| 3,575,500 | A | * | 4/1971 | Schlein | .................. | G03G 5/024 399/137 |
| 4,289,966 | A | * | 9/1981 | Roberts | ..................... | G01T 1/36 250/389 |
| 4,648,013 | A | * | 3/1987 | Curiel | ....................... | F21L 4/08 362/183 |

(Continued)

FOREIGN PATENT DOCUMENTS

CN 1542979 A 11/2004
CN 106057831 A 10/2016

(Continued)

*Primary Examiner* — David P Porta
*Assistant Examiner* — Djura Malevic
(74) *Attorney, Agent, or Firm* — CANON U.S.A., INC. IP Division

(57) ABSTRACT

An apparatus includes a supporting base arranged to support a panel arranged to detect incident radiation, a power supply including a positive terminal portion and a negative terminal portion, a substrate connected to the positive terminal portion and the negative terminal portion, an insulating sheet arranged between the supporting base, and the power supply and the substrate, wherein the power supply and the substrate are fixed to the insulating sheet, and a sheet fixing member arranged to fix at least one sheet end of a plurality of sheet ends of the insulating sheet to the supporting base.

20 Claims, 22 Drawing Sheets

(56) References Cited

U.S. PATENT DOCUMENTS

| | | | | |
|---|---|---|---|---|
| 5,705,291 A * | 1/1998 | Amatucci | H01M 4/505 | 29/623.5 |
| 5,991,468 A * | 11/1999 | Murakami | G06F 1/203 | 348/E5.025 |
| 6,020,867 A * | 2/2000 | Shimada | G09G 3/3611 | 345/905 |
| 6,218,050 B1 * | 4/2001 | Yoon | C01B 32/00 | 423/460 |
| 6,225,778 B1 * | 5/2001 | Hayama | H01M 50/566 | 320/112 |
| 6,348,304 B1 * | 2/2002 | Gula | G03C 1/79 | 430/536 |
| 6,524,739 B1 * | 2/2003 | Iwaizono | H01M 50/581 | 429/185 |
| 6,811,923 B1 * | 11/2004 | Sakai | H01M 10/54 | 429/231.1 |
| 6,882,703 B2 * | 4/2005 | Price | H01J 35/065 | 385/101 |
| 7,126,129 B2 * | 10/2006 | Yamamoto | A61B 6/544 | 250/370.08 |
| 7,192,674 B2 * | 3/2007 | Yoshimura | H01M 6/16 | 429/231.95 |
| 7,214,557 B2 * | 5/2007 | Nakata | H01L 24/45 | 257/E31.038 |
| 7,442,467 B2 * | 10/2008 | Ebi | H01M 50/184 | 429/185 |
| 7,495,226 B2 * | 2/2009 | Jadrich | G01T 1/20 | 250/370.09 |
| 7,663,114 B2 * | 2/2010 | Aoyagi | G01T 1/2928 | 250/370.09 |
| 7,709,803 B2 * | 5/2010 | Adachi | G01T 1/244 | 438/149 |
| 7,777,192 B2 * | 8/2010 | Ohta | A61B 6/563 | 250/370.09 |
| 7,842,928 B2 * | 11/2010 | Jadrich | G01T 1/2018 | 250/370.11 |
| 7,866,163 B2 * | 1/2011 | Ertel | G01T 1/2928 | 62/3.2 |
| 7,989,772 B2 * | 8/2011 | Yagi | G01T 1/2018 | 250/208.1 |
| 7,989,773 B2 * | 8/2011 | Jadrich | G01T 1/20 | 250/370.09 |
| 8,053,727 B2 * | 11/2011 | Nishino | A61B 6/56 | 250/336.1 |
| 8,080,802 B2 * | 12/2011 | Nishino | A61B 6/56 | 250/370.08 |
| 8,237,127 B2 * | 8/2012 | Yoshida | G03B 42/04 | 378/182 |
| 8,265,225 B2 * | 9/2012 | Nishino | A61B 6/4283 | 378/102 |
| 8,389,944 B2 * | 3/2013 | Jadrich | G01T 1/20 | 250/370.11 |
| 8,557,434 B2 * | 10/2013 | Taniguchi | H01M 50/116 | 429/163 |
| 8,654,926 B2 * | 2/2014 | Ohta | G01T 1/24 | 378/114 |
| 8,758,933 B2 * | 6/2014 | Takahashi | H01M 10/425 | 429/96 |
| 8,884,231 B2 * | 11/2014 | Noda | G01T 1/2002 | 250/361 R |
| 8,907,752 B2 * | 12/2014 | Wodrich | G06F 1/26 | 335/304 |
| 8,929,510 B2 * | 1/2015 | Nishino | A61B 6/4405 | 378/102 |
| 8,969,820 B2 * | 3/2015 | Suwa | A61B 6/4405 | 250/371 |
| 8,981,309 B2 * | 3/2015 | Noguchi | G03B 42/04 | 378/177 |
| 9,088,032 B2 * | 7/2015 | Jang | H01M 50/209 | |
| 9,117,562 B2 * | 8/2015 | Itaya | G01T 1/20 | |
| 9,168,016 B2 * | 10/2015 | Ohta | A61B 6/4405 | |
| 9,320,483 B2 * | 4/2016 | Kobayashi | A61B 6/00 | |
| 9,362,557 B2 * | 6/2016 | Watanabe | H01M 4/463 | |
| 9,380,988 B2 * | 7/2016 | Kitano | A61B 6/56 | |
| 9,535,165 B2 * | 1/2017 | Takatori | G01T 1/17 | |
| 9,776,517 B2 * | 10/2017 | Sakata | H01G 2/08 | |
| 9,812,686 B2 * | 11/2017 | Kako | H01M 10/058 | |
| 9,917,286 B2 * | 3/2018 | Sugeno | H01G 11/82 | |
| 9,978,234 B2 * | 5/2018 | Kano | G01T 1/244 | |
| 10,020,146 B2 * | 7/2018 | Okuda | H01H 35/26 | |
| 10,105,114 B2 * | 10/2018 | SHimizukawa | A61B 6/44 | |
| 10,251,252 B2 * | 4/2019 | Kim | H02J 7/008 | |
| 10,347,874 B2 * | 7/2019 | Yamamoto | H01M 50/242 | |
| 10,354,810 B2 * | 7/2019 | Ikenuma | H01G 11/40 | |
| 10,631,802 B2 * | 4/2020 | Horiuchi | A61B 6/4283 | |
| 10,682,105 B2 * | 6/2020 | Shimizukawa | A61B 6/56 | |
| 10,728,995 B2 * | 7/2020 | Kim | H02J 50/80 | |
| 10,772,589 B2 * | 9/2020 | Yang | A61B 6/42 | |
| 10,955,571 B2 * | 3/2021 | Suzuki | A61B 6/4283 | |
| 11,079,500 B2 * | 8/2021 | Yamazaki | H04N 5/32 | |
| 11,079,503 B2 * | 8/2021 | Horiuchi | G01T 1/2018 | |
| 11,101,501 B2 * | 8/2021 | Liu | H01M 10/0569 | |
| 11,141,120 B2 * | 10/2021 | Sakuragi | A61B 6/102 | |
| 11,145,944 B2 * | 10/2021 | Song | H01H 71/08 | |
| 2003/0003357 A1 * | 1/2003 | Tamai | H01M 50/103 | 29/623.2 |
| 2003/0138700 A1 * | 7/2003 | Yoshimura | H01M 6/16 | 429/231.95 |
| 2003/0173709 A1 * | 9/2003 | Iwaizono | B29C 45/2701 | 264/272.17 |
| 2003/0180582 A1 * | 9/2003 | Masumoto | H01M 50/209 | 429/149 |
| 2004/0022360 A1 * | 2/2004 | Price | H01J 35/065 | 378/121 |
| 2004/0048149 A1 * | 3/2004 | Gross | H01M 50/183 | 429/185 |
| 2004/0227096 A1 * | 11/2004 | Yagi | G01T 1/2928 | 378/189 |
| 2005/0164080 A1 * | 7/2005 | Kozu | H01M 50/572 | 429/162 |
| 2005/0208346 A1 * | 9/2005 | Moon | H01M 10/425 | 429/61 |
| 2005/0214581 A1 * | 9/2005 | Kohda | G01T 1/246 | 428/702 |
| 2005/0233206 A1 * | 10/2005 | Puttaiah | H01M 50/157 | 429/120 |
| 2006/0073384 A1 * | 4/2006 | Heo | H01M 10/4257 | 429/176 |
| 2006/0097177 A1 * | 5/2006 | Yamamoto | A61B 6/544 | 250/370.08 |
| 2006/0099503 A1 * | 5/2006 | Lee | H01M 50/128 | 429/177 |
| 2006/0099504 A1 * | 5/2006 | Kim | H01M 50/636 | 29/623.1 |
| 2006/0109958 A1 * | 5/2006 | Ertel | A61B 6/547 | 378/205 |
| 2006/0113481 A1 * | 6/2006 | Murphy | A61B 6/4233 | 250/370.09 |
| 2006/0127756 A1 * | 6/2006 | Seo | H01M 50/574 | 429/61 |
| 2006/0169992 A1 * | 8/2006 | Nakata | H01L 24/45 | 257/E31.038 |
| 2006/0199075 A1 * | 9/2006 | Moon | H01M 50/211 | 429/162 |
| 2006/0286450 A1 * | 12/2006 | Yoon | H01M 50/209 | 429/180 |
| 2007/0272873 A1 * | 11/2007 | Jadrich | G01T 1/20 | 250/370.11 |
| 2008/0061239 A1 * | 3/2008 | Bryan | G01V 8/12 | 250/341.1 |
| 2008/0112535 A1 * | 5/2008 | Wojcik | G01T 1/244 | 250/366 |
| 2008/0240358 A1 * | 10/2008 | Utschig | H01M 50/256 | 378/107 |
| 2009/0122959 A1 * | 5/2009 | Jadrich | G01T 1/20 | 378/91 |
| 2009/0191448 A1 * | 7/2009 | Yamamoto | H01M 50/134 | 264/261 |

(56) References Cited

U.S. PATENT DOCUMENTS

| | | | | |
|---|---|---|---|---|
| 2009/0258290 A1* | 10/2009 | Lee | H01M 50/116 | 429/163 |
| 2010/0088970 A1* | 4/2010 | Miller | H02S 40/38 | 52/173.1 |
| 2010/0148085 A1* | 6/2010 | Yoshida | G01T 1/00 | 250/336.1 |
| 2010/0158197 A1* | 6/2010 | Jadrich | G01T 1/2018 | 378/189 |
| 2010/0235206 A1* | 9/2010 | Miller | E04D 3/352 | 703/1 |
| 2011/0017281 A1* | 1/2011 | Funakoshi | H02G 3/16 | 136/251 |
| 2011/0042574 A1* | 2/2011 | Nishino | A61B 6/56 | 250/370.08 |
| 2011/0177396 A1* | 7/2011 | Moriwaka | H01M 4/133 | 429/304 |
| 2011/0195301 A1* | 8/2011 | Taniguchi | H01M 50/116 | 29/623.2 |
| 2011/0250475 A1* | 10/2011 | Yamamoto | H01M 50/116 | 264/272.21 |
| 2011/0272588 A1* | 11/2011 | Jadrich | G01T 1/2018 | 250/370.11 |
| 2011/0291240 A1* | 12/2011 | Yamazaki | H01M 4/1395 | 257/E29.342 |
| 2012/0064406 A1* | 3/2012 | Sato | H01M 4/0428 | 429/219 |
| 2012/0069966 A1* | 3/2012 | Kobayashi | A61B 6/4283 | 378/189 |
| 2012/0076266 A1* | 3/2012 | Kim | A61B 6/56 | 250/336.1 |
| 2012/0112075 A1* | 5/2012 | Noda | G01T 1/2002 | 250/361 R |
| 2012/0141866 A1* | 6/2012 | Kuriki | H01M 4/366 | 429/188 |
| 2012/0211661 A1* | 8/2012 | Itaya | G01T 1/202 | 250/367 |
| 2012/0261622 A1* | 10/2012 | Honma | H01M 4/625 | 252/507 |
| 2013/0052528 A1* | 2/2013 | Kuriki | H01M 10/0525 | 977/734 |
| 2013/0075619 A1* | 3/2013 | Sugizaki | H04N 5/32 | 250/394 |
| 2013/0078516 A1* | 3/2013 | Taniguchi | H01M 4/386 | 429/213 |
| 2013/0230772 A1* | 9/2013 | Noda | H01G 11/28 | 427/126.3 |
| 2013/0266858 A1* | 10/2013 | Inoue | H01G 11/50 | 427/126.3 |
| 2013/0323585 A1* | 12/2013 | Inoue | H01M 4/362 | 429/211 |
| 2014/0017531 A1* | 1/2014 | Uehara | H01M 10/643 | 429/82 |
| 2014/0087251 A1* | 3/2014 | Takahashi | H01M 4/62 | 429/211 |
| 2014/0099554 A1* | 4/2014 | Inoue | H01G 9/042 | 423/325 |
| 2014/0127566 A1* | 5/2014 | Kuriki | H01M 4/366 | 429/211 |
| 2014/0127567 A1* | 5/2014 | Kuriki | H01G 11/42 | 427/126.3 |
| 2014/0211921 A1* | 7/2014 | Bandis | H01M 50/24 | 429/96 |
| 2014/0226795 A1* | 8/2014 | Kitano | A61B 6/56 | 378/189 |
| 2014/0252229 A1* | 9/2014 | Kondo | A61B 6/4283 | 250/336.1 |
| 2015/0071414 A1* | 3/2015 | Oda | A61B 6/54 | 378/207 |
| 2015/0194642 A1* | 7/2015 | Yamamoto | H01M 50/116 | 29/623.5 |
| 2015/0262762 A1* | 9/2015 | Ikenuma | H01M 4/366 | 429/232 |
| 2015/0293237 A1* | 10/2015 | Suzuki | G01T 1/2018 | 250/369 |
| 2015/0298557 A1* | 10/2015 | Sakata | B60L 50/51 | 307/10.1 |
| 2016/0074000 A1* | 3/2016 | Uehara | A61B 6/547 | 378/69 |
| 2016/0089092 A1* | 3/2016 | Shimizukawa | A61B 6/4233 | 378/98 |
| 2016/0149177 A1* | 5/2016 | Sugeno | H01G 11/10 | 429/151 |
| 2016/0206276 A1* | 7/2016 | Kobayashi | A61B 6/56 | |
| 2016/0299237 A1* | 10/2016 | Kondo | G01T 1/2023 | |
| 2017/0038252 A1* | 2/2017 | Suzuki | A61B 6/102 | |
| 2017/0062819 A1* | 3/2017 | Ikenuma | H01M 4/622 | |
| 2017/0090044 A1* | 3/2017 | Suzuki | G01T 1/2018 | |
| 2017/0306826 A1* | 10/2017 | Yoshikawa | F01N 9/002 | |
| 2017/0311913 A1* | 11/2017 | Suzuki | A61B 6/4216 | |
| 2017/0346323 A1* | 11/2017 | MacLaughlin | G01T 7/00 | |
| 2017/0367666 A1* | 12/2017 | Horiuchi | A61B 6/4283 | |
| 2017/0372572 A1* | 12/2017 | Kano | G01T 1/244 | |
| 2018/0110495 A1* | 4/2018 | MacLaughlin | A61B 6/545 | |
| 2018/0368789 A1* | 12/2018 | Shimizukawa | A61B 6/4208 | |
| 2019/0008472 A1* | 1/2019 | Tajima | A61B 6/4266 | |
| 2019/0018151 A1* | 1/2019 | Kawaguchi | G01T 7/00 | |
| 2019/0196033 A1* | 6/2019 | Horiuchi | G01T 1/24 | |
| 2019/0293812 A1* | 9/2019 | Suzuki | H02J 50/00 | |
| 2020/0144604 A1* | 5/2020 | Takahashi | H01M 4/587 | |
| 2021/0143419 A1* | 5/2021 | Ikenuma | H01M 10/0525 | |
| 2021/0143508 A1* | 5/2021 | Yoshida | H01M 10/6557 | |
| 2021/0199602 A1* | 7/2021 | Fukushima | G01N 23/04 | |
| 2021/0351452 A1* | 11/2021 | Yamashiro | H01M 10/613 | |

FOREIGN PATENT DOCUMENTS

| | | |
|---|---|---|
| JP | H11-31486 A | 2/1999 |
| JP | 2008-090304 A | 4/2008 |
| JP | 2008212343 A | 9/2008 |
| JP | 2009300084 A | 12/2009 |
| JP | 2010-127882 A | 6/2010 |
| JP | 2010127680 A | 6/2010 |
| JP | 2011-071134 A | 4/2011 |
| JP | 2011252732 A | 12/2011 |
| JP | 2012083144 A | 4/2012 |
| JP | 2012150320 A | 8/2012 |
| JP | 2012237692 A | 12/2012 |
| JP | 2013003478 A | 1/2013 |
| JP | 2013-224949 A | 10/2013 |
| JP | 2016066462 A | 4/2016 |
| JP | 2017-067564 A | 4/2017 |
| JP | 2017067564 A | 4/2017 |
| JP | 2019196944 A | 11/2019 |

* cited by examiner

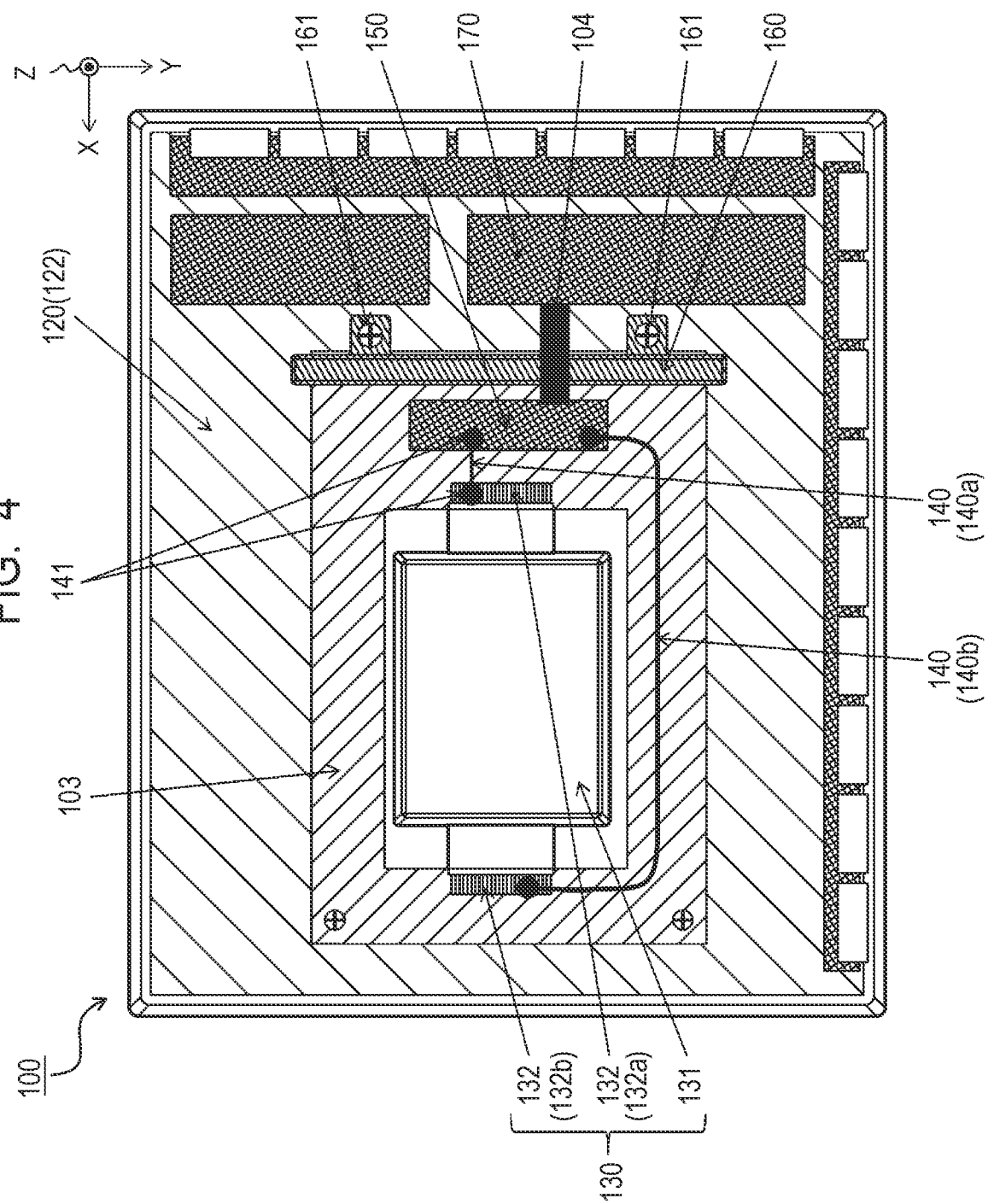

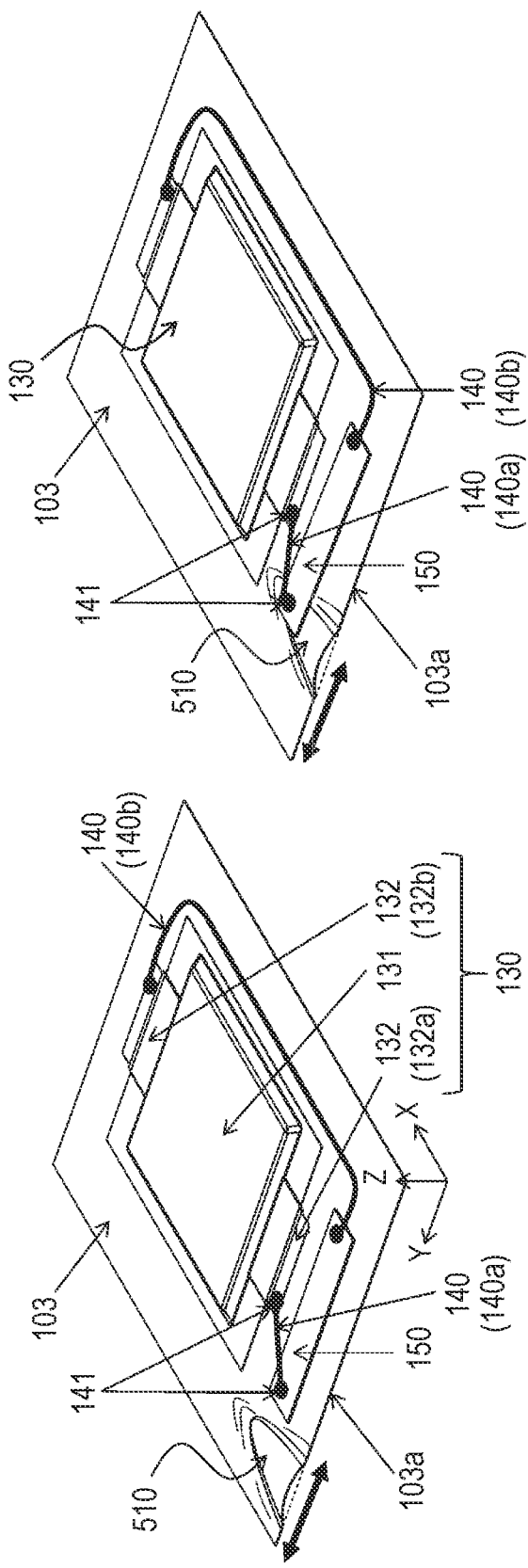

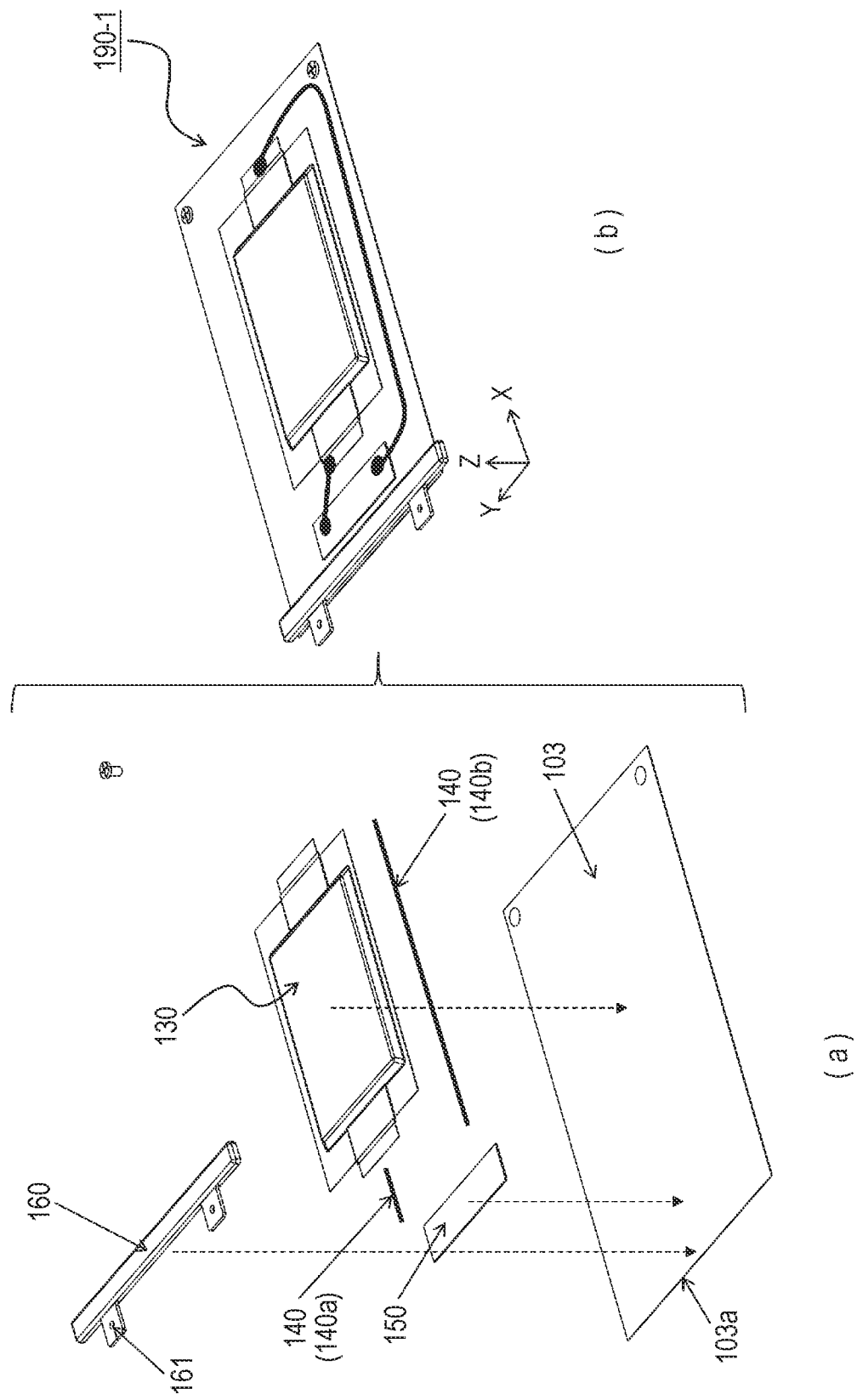

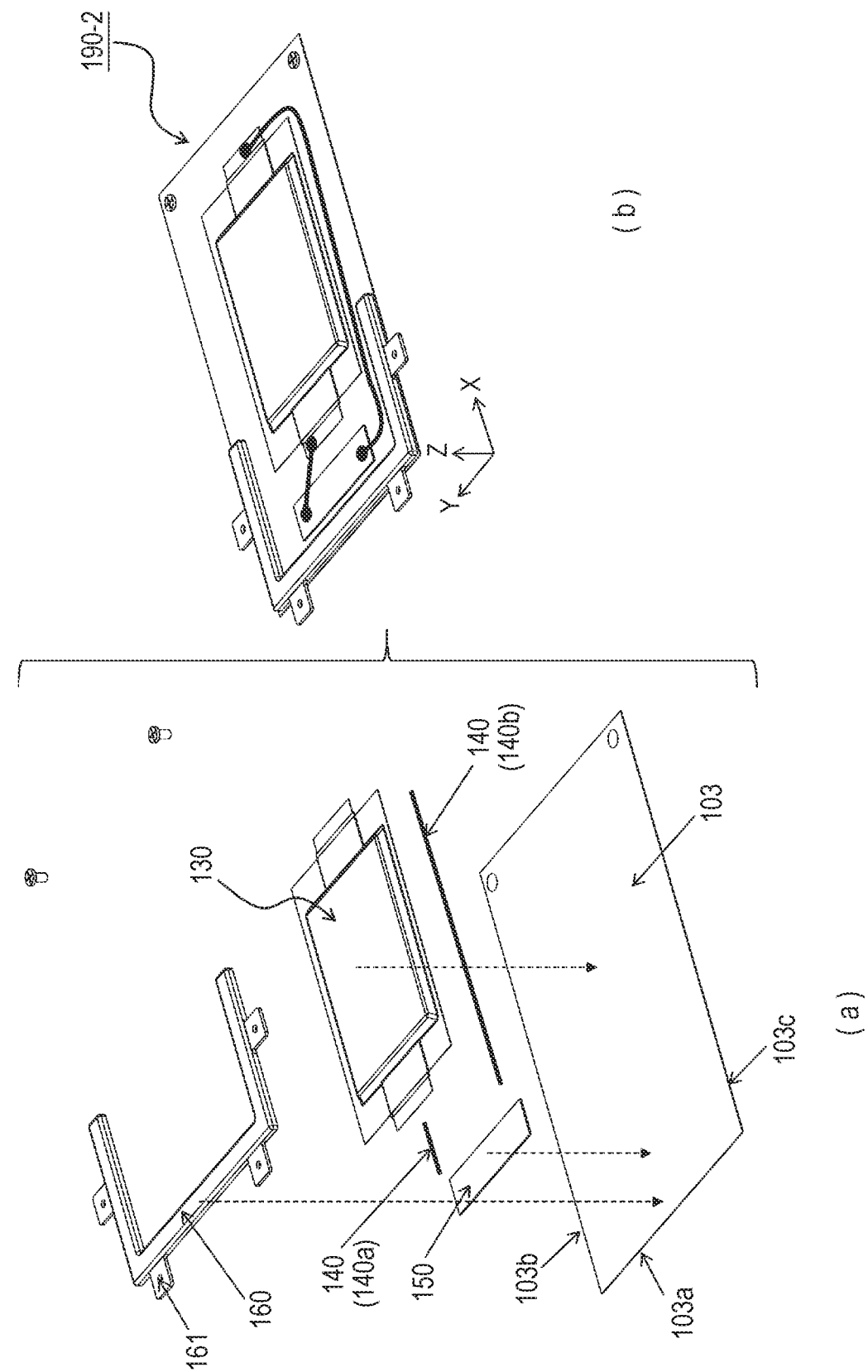

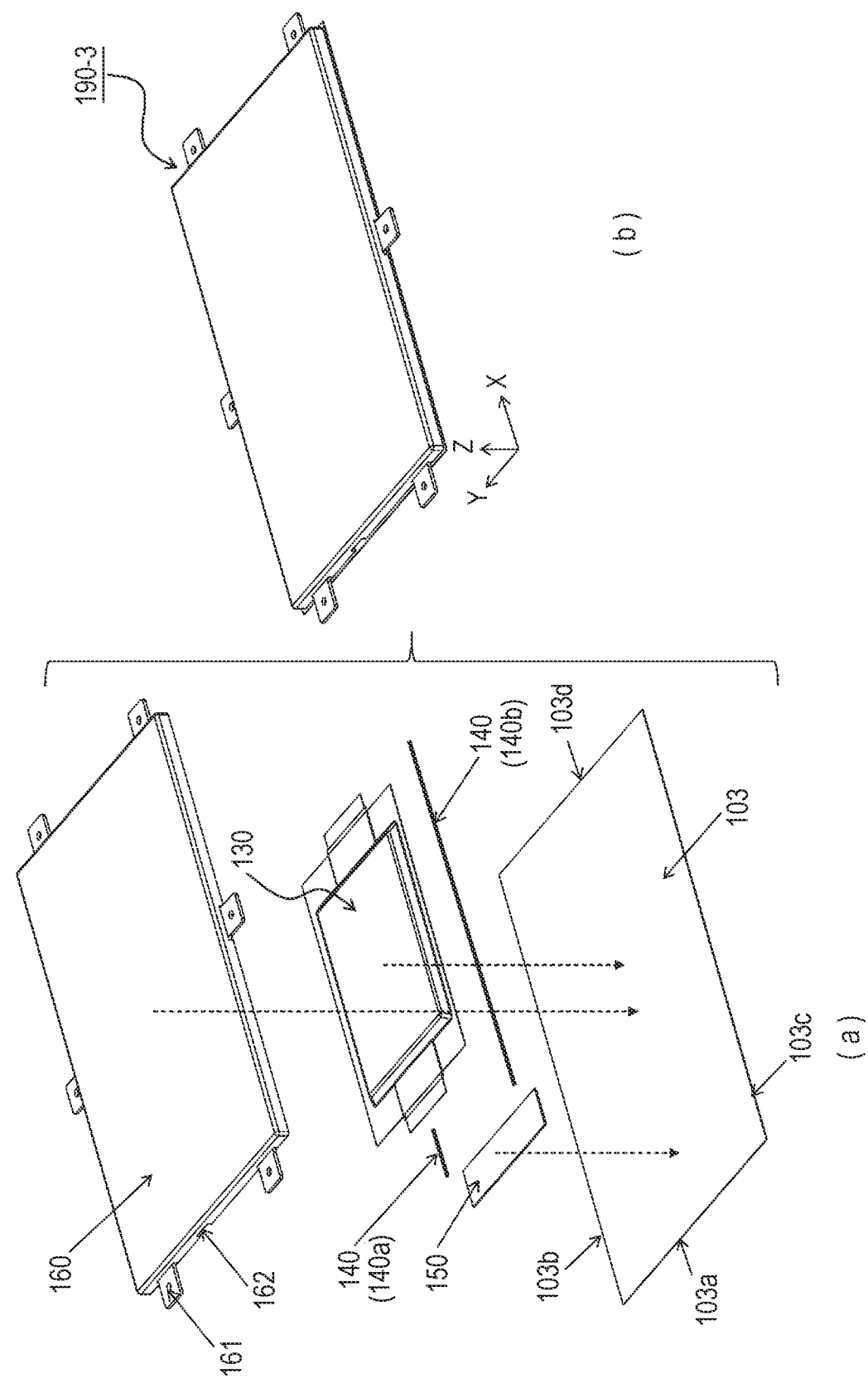

POWER SUPPLY UNIT AND RADIATION IMAGING APPARATUS INCLUDING THE SAME

BACKGROUND OF THE DISCLOSURE

Field of the Disclosure

The aspect of the embodiments relates to a power supply unit including a secondary battery, and a radiation imaging apparatus including the power supply unit.

Description of the Related Art

Radiation imaging apparatuses that detect an intensity distribution of radiation that has passed through a subject to obtain a radiation image are widely used for industrial non-destructive testing and medical diagnoses. In order to enable rapid imaging of a wide part of the subject, radiation imaging apparatuses with improved portability and operativity are being developed. For example, a radiation imaging apparatus is known that has improved portability by having a built-in or detachable power supply for supplying electric power.

Rechargeable secondary batteries are generally used for power supplies, and in particular, capacitors have advantages in that the capacitors allow faster charging and a longer charging/discharging cycle life compared with lithium-ion secondary batteries and lead-acid batteries. In Japanese Patent Application Laid-Open No. 2012-237692 and Japanese Patent Application Laid-Open No. 2013-003478, radiation imaging apparatuses using a capacitor as a power supply are disclosed. On the other hand, in US Patent Publication No. 2017/0090044, a radiation imaging apparatus in which a concave portion for gripping (grip portion) that is concave toward the inside is formed in an external housing for improving portability is disclosed.

In a secondary battery used as an internal power source, in one embodiment, a positive terminal portion and a negative terminal portion are connected to a substrate with a lead wire, etc. On this occasion, although solder is usually used for fixing the lead wire to the terminal portions, it is not preferable from viewpoints of workability and safety to perform such fixing in the state where the secondary battery is incorporated in a radiation imaging apparatus. Each terminal portion of the power supply can be connected in advance to a wire and housed in a case to form the configuration of a power supply unit, and thereafter can be assembled in the radiation imaging apparatus. However, with the configuration of the power supply unit, since the thickness is increased, the power supply unit may not be able to be housed in a housing of the radiation imaging apparatus. On the other hand, when a sheet is used instead of the case to reduce the thickness, the connected portions between the terminal portions and the lead wire may be damaged due to lifting (deflection) and wrinkles of the sheet.

Additionally, in a portable radiation imaging apparatus, due to shock by falling, collision and vibration, the external housing may be deformed, a capacitor and the housing may contact each other, and the lamination of the capacitor may be damaged. At this time, the capacitor loses the insulation from the outside, and will be in a very dangerous state.

On the other hand, in order to supply sufficient electric power, a corresponding volume of the capacitor is required. Although the limited volume inside the radiation imaging apparatus will be occupied, when a grip portion is provided, since the volume is decreased, it is difficult to properly arrange the grip portion and the capacitor inside.

SUMMARY OF THE DISCLOSURE

An apparatus according to one embodiment of the disclosure includes a panel arranged to detect incident radiation, a supporting base arranged to support the panel on a rear surface side of the panel when seen from an incident direction of radiation, a power supply arranged on the rear surface side of the supporting base, and including a positive terminal portion and a negative terminal portion, a substrate connected to each of the positive terminal portion and the negative terminal portion, an insulating sheet arranged between the supporting base and the power supply, the power supply and the substrate fixed to the insulating sheet, and a sheet fixing member arranged to fix at least one end of a plurality of ends of the insulating sheet to the supporting base.

A power supply unit according to another embodiment of the disclosure includes a power supply including a positive terminal portion and a negative terminal portion, a substrate connected to the positive terminal portion and the negative terminal portion, an insulating sheet to which the power supply and the substrate are fixed, and a sheet fixing member arranged to fix at least one end of a plurality of ends of the insulating sheet.

Further features of the disclosure will become apparent from the following description of exemplary embodiments with reference to the attached drawings.

BRIEF DESCRIPTION OF THE DRAWINGS

FIG. 4 is a schematic diagram illustrating the internal structure of the radiation imaging apparatus according to the first embodiment seen from a rear surface side of a housing.

FIG. 5A and FIG. 5B are reference diagrams for describing the case in the state where a sheet end of a bottom surface sheet is opened without being fixed to a supporting base.

FIG. 6 illustrates a perspective view and an exploded view of a power supply unit according to the first embodiment.

FIG. 7 illustrates a perspective view and an exploded view of a power supply unit according to a second embodiment.

FIG. 8 illustrates a perspective view and an exploded view of a power supply unit according to a third embodiment.

DESCRIPTION OF THE EMBODIMENTS

Exemplary embodiments of the disclosure will now be described in detail in accordance with the accompanying drawings. However, the details of the sizes and structures illustrated in each embodiment of the disclosure described below are not limited to those described in the specification and drawings. Additionally, in this specification, the radiation according to the aspect of the embodiments is not limited to X-rays, and $\alpha$ rays, $\beta$ rays, $\gamma$ rays, corpuscular rays, cosmic rays, etc. are also included.

First Embodiment

Figure 1A:
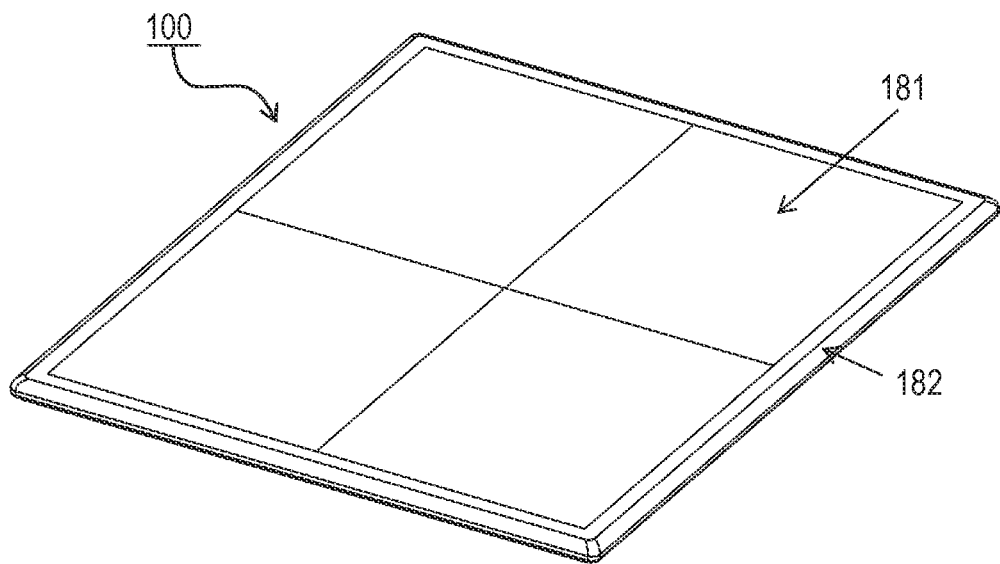
FIG. 1A and FIG. 1B are external perspective views of a radiation imaging apparatus according to a first embodiment.
Figure 1B:
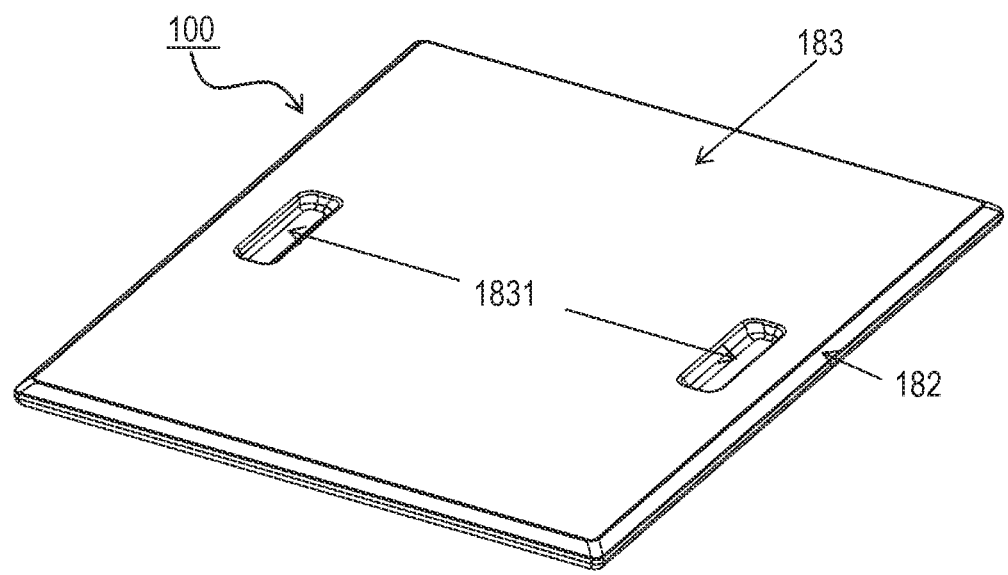

FIG. 1A and FIG. 1B are external perspective views of a radiation imaging apparatus (hereinafter, the imaging apparatus) 100 according to a first embodiment. FIG. 1A is an external perspective view of an external housing of the imaging apparatus 100 seen from the side of an incident surface 181 on which radiation is incident. Additionally, FIG. 1B is an external perspective view of the external housing of the imaging apparatus 100 seen from the side of a rear surface 183 located on the opposite side of the incident surface 181. Concave portions 1831 that are concave toward the inside of the imaging apparatus 100 is formed in the rear surface 183 for improvement of the portability of the imaging apparatus 100.

Figure 2A:
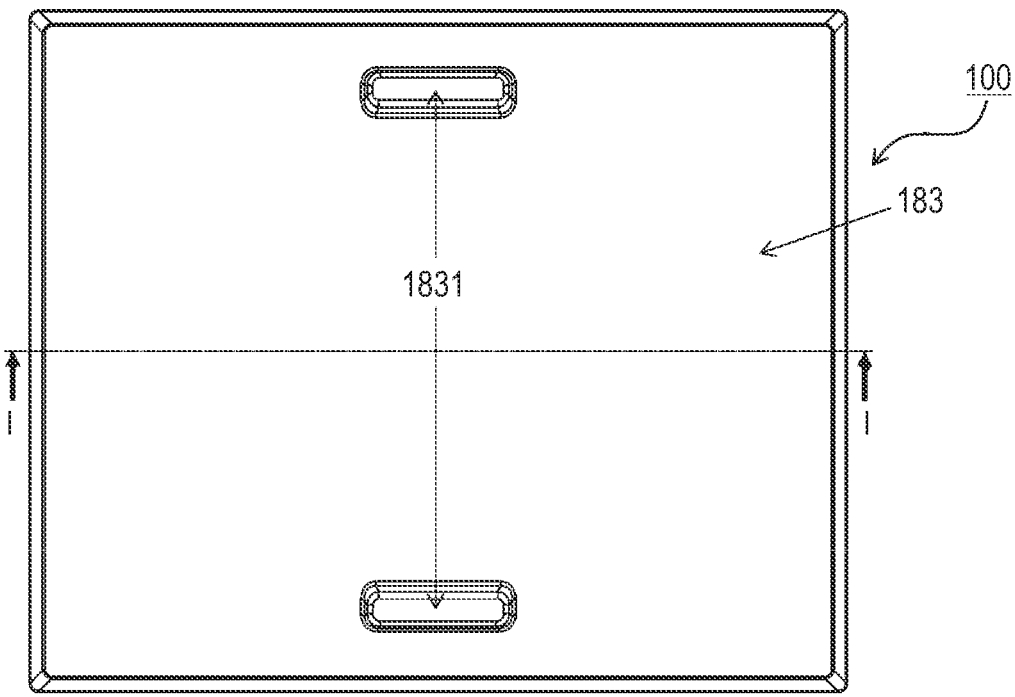
FIG. 2A is a front view of the radiation imaging apparatus according to the first embodiment.
Figure 2B:
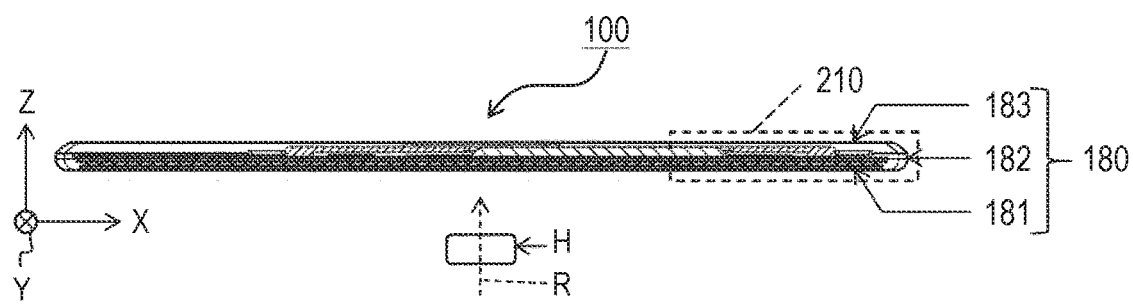
FIG. 2B and FIG. 2C are cross-sectional views of the radiation imaging apparatus according to the first embodiment.
Figure 2C:
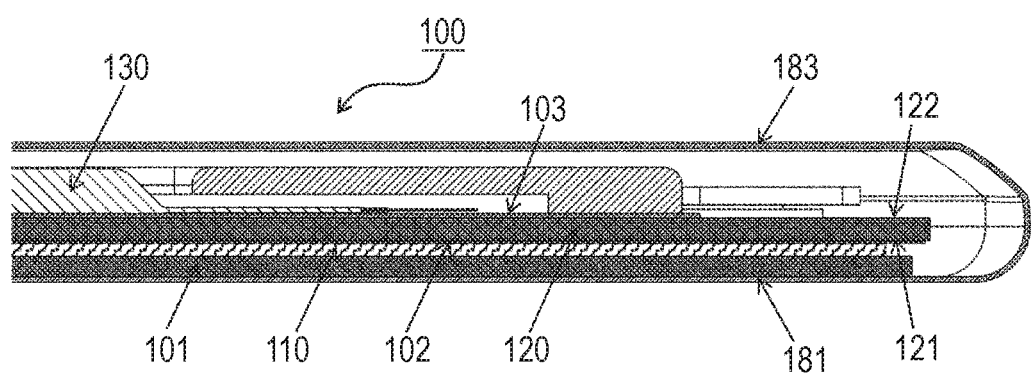

FIG. 2A to FIG. 2C are diagrams illustrating an example of the external appearance and internal configuration of the imaging apparatus 100. FIG. 2A is an external view of the rear surface 183 of the imaging apparatus 100 illustrated in FIG. 1B seen from the front.

In addition, FIG. 2B is a diagram illustrating an example of the internal configuration of the imaging apparatus 100 at the I-I cross-section illustrated in FIG. 2A. Additionally, in FIG. 2B, an XYZ coordinate system is illustrated in which the radiation incident direction in which radiation R (including the radiation R that has passed through a subject H) indicated by a dotted arrow is a Z direction, and the directions that are perpendicular to the Z direction and that are perpendicular to each other are an X direction and a Y direction (XYZ coordinate systems illustrated in the following figures are also similarly defined). Further, in FIG. 2B, the incident surface 181 on which the radiation R is incident, the rear surface 183 located on the opposite side of the incident surface 181, and a housing 180 configured by including a side surface 182 connecting the incident surface 181 and the rear surface 183 are also illustrated.

Additionally, FIG. 2C is an enlarged view of an area 210 of the imaging apparatus 100 illustrated in FIG. 2B. In this FIG. 2C, a shock-absorbing sheet 101, a radiation detecting panel 110, a radiation shielding sheet 102, a supporting base 120, a bottom surface sheet 103, and a power supply 130 are laminated and arranged from the incident surface 181 toward the rear surface 183 of the housing 180 as the internal configuration of the imaging apparatus 100. It is defined by the JIS (Japanese Industrial Standards) that the thickness of the imaging apparatus 100 be limited to about 15 mm depending on the product, and in this case, internal components are accommodated within the thin housing 180.

The shock-absorbing sheet 101 is, for example, a sheet for absorbing a shock to the radiation detecting panel (hereinafter, the detecting panel) 110 when the housing 180 receives the shock.

The detecting panel 110 detects the incident radiation R (including the radiation R that has passed through the subject H) emitted by a radiation generating apparatus (not illustrated). The detecting panel 110 converts the incident radiation R into a radiation image signal, which is an electric signal, according to its strength. Additionally, the detecting panel 110 is generally formed by using glass, and since it is assumed that cracking occurs when receiving strong shock, load and displacement, the detecting panel 110 is bonded to the supporting base 120 having a high strength and planarity.

The radiation shielding sheet 102 has the functions of protecting a circuit board (not illustrated) from the radiation R that has passed through the subject H and the detecting panel 110, and preventing the radiation R from being incident on the detecting panel 110 again due to reflection, etc.

The supporting base 120 is a base that supports the detecting panel 110 on the side of a first surface 121. Additionally, the bottom surface sheet 103, the power supply 130, etc. are arranged on a second surface 122, which is on the opposite side of the first surface 121 of the supporting base 120.

The bottom surface sheet 103 is a sheet arranged between the supporting base 120 and the power supply 130, and is an insulating sheet in the first embodiment.

The power supply 130 supplies electric power to each component portion inside the imaging apparatus 100 driven by electricity. In the first embodiment, the power supply 130 can be a laminated lithium-ion capacitor. Note that a rechargeable power supply, such as an electric double layer capacitor, a lithium-ion battery, and a lithium-ion secondary battery, can be adapted. Since capacitors, such as lithium-ion capacitors and electric double layer capacitors, have a longer charging/discharging cycle life, and can reduce the replacement frequency of the power supply compared with lithium-ion batteries and lithium-ion secondary batteries, the capacitors are suitable as built-in power supplies that are not replaced by users. Additionally, although lithium-ion capacitors and electric double layer capacitors are classified into the same capacitors, generally, lithium-ion capacitors have higher energy density, and are suitable for an apparatus requiring a high energy density at the time of imaging, such as the imaging apparatus 100. There are various shapes such as a cylinder shape, a square shape and a laminated type as the shape of the power supply 130. Among these, the laminated type is suitable for being accommodated in the thin housing 180 such as the imaging apparatus 100, since the laminated type has the configuration with multiple layers of thin electrodes, and can reduce the thickness.

Figure 3A:
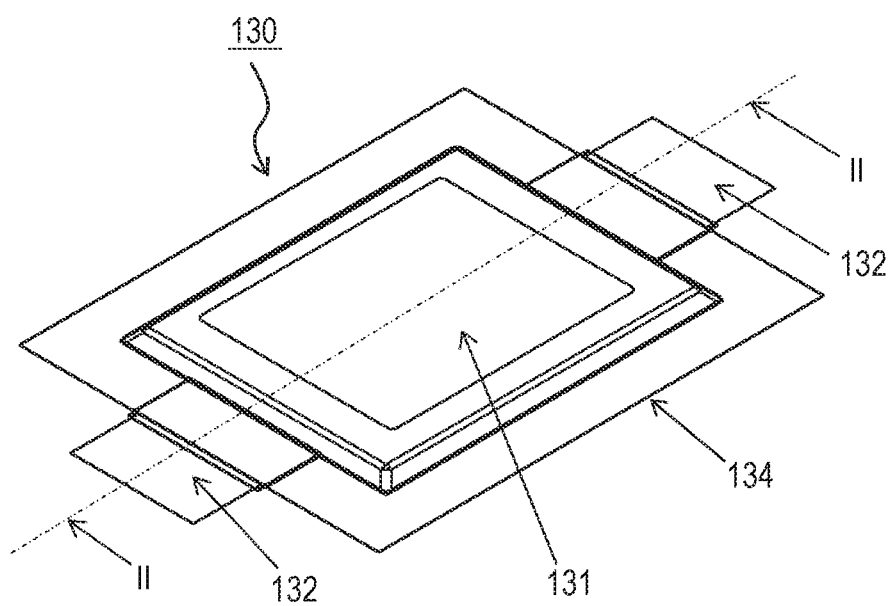
FIG. 3A is a perspective view of a power supply according to the first embodiment.
Figure 3B:
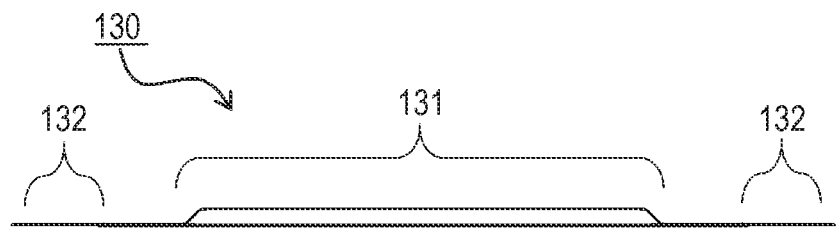
FIG. 3B is a cross-sectional view of the power supply according to the first embodiment.

Here, the schematic configuration of the power supply 130 will be described by using FIG. 3A and FIG. 3B. FIG. 3A is a diagram illustrating an example of the external configuration of the power supply 130 in FIG. 2C, and FIG. 3B is a diagram illustrating an example of the schematic configuration of the power supply 130 in FIG. 2C at the II-II cross-section illustrated in FIG. 3A.

Although the power supply 130 can be a laminated-type lithium-ion capacitor, since the laminated-type lithium-ion capacitor is thin, lightweight and compact, a capacitor in which a cell is packaged by an exterior, such as resin, may be used. The capacitor 130 includes a body portion 131 on which an electrode is laminated, a sealing portion 134 that covers the surroundings of the body portion 131, and terminal portions 132 for electrically connecting the capacitor 130 and external configuration portions. Here, it is common that the body portion 131 is the thickest in the configuration of the capacitor 130. When mounting the capacitor 130 on the imaging apparatus 100-1, a large space is required. Additionally, the durability as electric terminal portions is required for the terminal portions 132. A space is provided or a protection member is arranged around the terminal portion 132 so that the terminal portions 132 do not contact other structures when an external force is applied to the imaging apparatus 100-1. Generally, when the capacitance of a secondary battery is improved, more imaging can be performed on a single charge when utilized by an operator. However, in order to improve the capacitance of the capacitor 130, the volume of the capacitor 130 is also increased, and in this case, in the imaging apparatus 100-1 that has restrictions in the thickness direction, the size in the plane direction tends to be increased. In the first embodiment, a protection member is arranged on the body portion 131 in which the thickness becomes greatest, and the capacitor 130 can be protected from contact with the housing 180 due to an external force (shock).

FIG. 4 is a diagram illustrating an example of the internal configuration of the imaging apparatus 100 illustrated in FIG. 2A to FIG. 2C seen from the rear surface 183 side of the housing 180, and illustrates each configuration portion arranged on the second surface 122 side of the supporting base 120.

The bottom surface sheet 103, the power supply 130, lead wires 140, a substrate 150, a sheet fixing member 160, an FFC 104, and a substrate 170 are arranged on the second surface 122 side of the supporting base 120 in the imaging apparatus 100.

The power supply 130 includes the body portion 131 and the terminal portions 132, and the terminal portions 132 include a positive terminal portion 132a and a negative terminal portion 132b. The terminal portion 132 close to the substrate 150 is the positive terminal portion 132a, and the terminal portion 132 far from the substrate 150 is the negative terminal portion 132b. Note that the arrangement of the positive terminal portion 132a and the negative terminal portion 132b may be reversed.

The lead wires 140 include a lead wire 140a electrically connecting the positive terminal portion 132a and the substrate 150, and a lead wire 140b electrically connecting the negative terminal portion 132b of the power supply 130 and the substrate 150.

The substrate 150 is electrically connected to the positive terminal portion 132a and the negative terminal portion 132b of the power supply 130 via the lead wires 140. The substrate 150 performs control of the power supply 130, etc.

The bottom surface sheet 103 is an insulating sheet that is arranged between the supporting base 120, and the power supply 130 and the substrate 150, and to which the power supply 130 and the substrate 150 are fixed.

The sheet fixing member 160 is a member that fixes at least one sheet end among multiple sheet ends of the bottom surface sheet 103 to the supporting base 120. The sheet fixing member 160 fixes the sheet end closest to the substrate 150 among the multiple sheet ends of the bottom surface sheet 103 to the second surface 122 of the supporting base 120. Additionally, this sheet fixing member 160 is fixed to the second surface 122 of the supporting base 120 with screws inserted from screw holes 161.

The FFC 104 is a flexible flat cable that electrically connects the substrate 150 to the substrate 170.

The substrate 170 is fixed to the supporting base 120, and performs the charge control of the power supply 130 and the drive control of the detecting panel 110, and generates the radiation image signal (the image data of a radiation image), which is an electric signal converted by the detecting panel 110. Then, the radiation image signal obtained in the substrate 170 is subjected to image processing, and is transferred to an external apparatus.

The housing 180 contains the shock-absorbing sheet 101, the detecting panel 110, the radiation shielding sheet 102, the supporting base 120, the bottom surface sheet 103, the power supply 130, the lead wires 140, the substrate 150, the sheet fixing member 160, the FFC 104 and the substrate 170.

Additionally, although various methods using screws, solder, etc. can be selected for the connecting method of the positive terminal portion 132a and the negative terminal portion 132b of the power supply 130 to the lead wires 140, in the first embodiment, a connecting method using solder is used from a viewpoint of the thickness. Wire connecting portions 141 are connecting portions of the lead wires 140 connected to the terminal portions 132 by using solder.

At the time of handling of the power supply 130, and at the time of operations such as connection with the lead wires 140, it is necessary to pay sufficient attention to a short circuit between the terminal portions. Accordingly, the connecting operation between the terminal portions 132 of the power supply 130 and the lead wires 140 can be performed in an easy-to-operate environment, and connection of the lead wires 140 after housing the power supply 130 and the substrate 150 in the imaging apparatus 100 can be avoided. That is, the terminal portions 132 of the power supply 130 and the substrate 150 can be connected to each other in advance to form the configuration of a unit, and thereafter this can be incorporated into the imaging apparatus 100.

It is a common unitization to house the power supply 130 in a hollow case. However, the thickness of the imaging apparatus 100 is very thin, and when the bottom surface and the upper surface of the power supply 130 are entirely covered by a thick case, it is very difficult to accommodate the power supply 130 in the imaging apparatus 100. On the other hand, when a case is made very thin to accommodate the unit of the power supply 130 in the imaging apparatus 100, warp occurs, and it is difficult to mold the case. However, for example, even when a sheet is used on the bottom surface side of the power supply 130 without using an injection-molded case, lifting (further, wrinkles) that occurs in the sheet may lead to damage to the wire connecting portions 141 and the terminal portions 132.

FIG. 5A and FIG. 5B are diagrams illustrating the case where the sheet end of the bottom surface sheet 103 in FIG. 4 is opened without being fixed to the supporting base as a reference example.

When in the state where a sheet end 103a of the bottom surface sheet 103 is opened, lifting 510 of the bottom surface sheet will move relatively easily. Then, it has been found that, when the lifting 510 illustrated in this FIG. 5A moves to the vicinity of the substrate 150 illustrated in FIG. 5B, a load is applied to the wire connecting portions 141, and the wire connecting portions 141 and the terminal portions 132 are damaged in some cases. Therefore, in the first embodiment, this problem is solved by fixing the sheet end 103a of the bottom surface sheet 103 by the sheet fixing member 160.

FIG. 6 is a diagram illustrating an example of the schematic configuration of a power supply unit 190 according to the first embodiment of the disclosure. In the following description, the power supply unit 190 according to the first embodiment illustrated in (b) of FIG. 6 will be written as "the power supply unit 190-1".

As illustrated in (a) of FIG. 6, the power supply unit 190-1 is configured by including the bottom surface sheet 103, the power supply 130, the lead wires 140, the substrate 150, and the sheet fixing member 160. In the power supply unit 190-1, since the sheet end 103a of the bottom surface sheet 103 is fixed by the sheet fixing member 160 (specifically, the sheet end 103a is fixed to the supporting base 120 as illustrated in FIG. 4), the space created by the lifting 510 (further, wrinkles) of the bottom surface sheet 103 illustrated in FIG. 5A and FIG. 5B will be confined inside the bottom surface sheet 103. Accordingly, since the movement of the lifting 510 of the bottom surface sheet 103 is regulated, the movement of the lifting 510 to the vicinity of the wire connecting portions 141 can be suppressed, and damage to the wire connecting portions 141 and the terminal portions 132 can be suppressed.

Additionally, since the portion of the sheet end of the bottom surface sheet 103 fixed by the sheet fixing member 160 can be as close as possible to a portion where it is desired to suppress damage, the sheet end 103a closest to the wire connecting portions 141 (closest to the substrate 150) is fixed.

In addition, it is necessary to fix the power supply unit 190-1 to the imaging apparatus 100. In the first embodiment, the configuration is adopted in which the power supply unit 190-1 is fixed to the supporting base 120 provided inside the imaging apparatus 100 as illustrated in FIG. 4. There is little possibility that the supporting base 120 itself is deformed, since the supporting base 120 does not directly receive a shock or load from the outside, and the shock-absorbing sheet 101 arranged in the imaging apparatus 100 mitigates the influence of the stress from the outside, deformation, etc. Accordingly, by fixing the power supply unit 190-1 to the supporting base 120, the possibility that the power supply unit 190-1 is deformed, and the wire connecting portions 141 and the power supply 130 itself are damaged can be reduced. On the other hand, when the power supply unit 190-1 is fixed to the external housing 180 of the imaging apparatus 100, there is a possibility of damage due to deformation of the power supply unit 190-1, since deformation due to a shock or load is directly transmitted. Especially, since the bottom surface of the power supply unit 190-1 is relatively easily deformed by an external force, because the bottom surface of the power supply unit 190-1 is the bottom surface sheet 103, the bottom surface sheet 103 can be fixed to the supporting base 120.

The bottom surface sheet 103 is fixed to the supporting base 120 via the sheet fixing member 160. Although screw fixing is assumed as the fixing method of the supporting base 120 and the sheet fixing member 160 in the first embodiment, in addition to this screw fixing, various methods such as tape fixing and adhesives can be listed. In order to make actions such as replacement of the power supply unit 190 easy, fixing can be made separable.

The bottom surface sheet 103 refers to a sheet-like material, and also includes a sheet made by press-forming, vacuum forming, etc., and a film made by inflation molding. As the material of the bottom surface sheet 103, polycarbonate, polyester, Teflon (registered trademark), etc. can be listed, but the material of the bottom surface sheet 103 is not limited to these. In order to prevent the terminal portions 132 of the power supply 130 and the supporting base 120 from directly contacting to each other, the bottom surface sheet 103 is an insulating sheet. Additionally, when the thickness of the bottom surface sheet 103 is too thin, there is a possibility that the bottom surface sheet 103 may be bent at the time of conveyance and assembly operation of the power supply unit 190-1, without being able to bear the weight of the power supply 130, and when too thick, the power supply unit 190-1 cannot be accommodated in the imaging apparatus 100. Therefore, in one embodiment, the thickness is approximately 0.05 mm to approximately 1.0 mm. In another embodiment, the thickness of the bottom surface sheet 103 is approximately 0.1 mm to approximately 0.5 mm. The bottom surface sheet 103, and the power supply 130 and the substrate 150 arranged on the bottom surface sheet 103 can be fixed, and as the fixing method in this case, various methods can be used, such as tapes, adhesives, lamination, and providing components separately.

The sheet fixing member 160 can be formed of a material with a high rigidity, and as the material of the sheet fixing member 160, for example, thermoplastic resin such as polycarbonate, PC-ABS, polyurethane, polyethylene terephthalate, denatured PPE and polypropylene, integrated mica, etc. can be listed.

As described above, in the imaging apparatus 100 and the power supply unit 190-1 according to the first embodiment, the sheet end 103a of the bottom surface sheet 103 is fixed by the sheet fixing member 160. According to such a configuration, the imaging apparatus 100 and the power supply unit 190-1 that have less damage to the wire connecting portions 141 between the terminal portions 132 of the power supply 130 and the lead wires 140, while reducing the thickness, can be provided.

Second Embodiment

In the following description of a second embodiment, a description of matters common to the above-described first embodiment will be omitted, and matters different from the first embodiment will be mainly described (similarly, in the following description of embodiments, matters different from the previously described embodiment will be mainly described).

In the second embodiment, the shape of the sheet fixing member 160 that fixes the sheet end of the bottom surface sheet 103 is different from that in the first embodiment.

FIG. 7 is a diagram illustrating an example of the schematic configuration of the power supply unit 190 according to the second embodiment of the disclosure. Additionally, in the following description, the power supply unit 190 according to the second embodiment illustrated in (b) of FIG. 7 will be written as "the power supply unit 190-2".

In the power supply unit 190-2, the sheet fixing member 160 fixes multiple sheet ends 103*a*, 103*b* and 103*c* of the bottom surface sheet 103 illustrated in (a) of FIG. 7 (specifically, fixes the sheet ends 103*a* to 103*c* to the supporting base 120). Since the sheet fixing member 160 fixes the sheet ends 103*a* to 103*c* of the bottom surface sheet 103 located around the substrate 150, the movement of the lifting 510 of the bottom surface sheet 103 that occurs in the vicinity of the substrate 150 can be more regulated. Note that, although the sheet fixing member 160 fixing the three sheet ends 103*a* to 103*c* is integrally constructed, the sheet fixing member 160 may be separately constructed to fix each of the sheet ends 103*a* to 103*c*.

As described above, in the imaging apparatus 100 and the power supply unit 190-2 according to the second embodiment, the sheet ends 103*a* to 103*c* of the bottom surface sheet 103 (insulating sheet) are fixed by the sheet fixing member 160. According to such a configuration, the imaging apparatus 100 and the power supply unit 190 can be provided that have even less damage to the wire connecting portions 141 between the terminal portions 132 of the power supply 130 and the lead wires 140, while reducing the thickness.

Third Embodiment

In a third embodiment, the shape of the sheet fixing member 160 that fixes the sheet ends of the bottom surface sheet 103 is different from those in the first embodiment and the second embodiment.

FIG. 8 is a diagram illustrating an example of the schematic configuration of the power supply unit 190 according to the third embodiment of the disclosure. Additionally, in the following description, the power supply unit 190 according to the third embodiment illustrated in (b) of FIG. 8 will be written as "the power supply unit 190-3".

In the power supply unit 190-3, the sheet fixing member 160 fixes all sheet ends 103*a* to 103*d* of the bottom surface sheet 103 illustrated in (a) of FIG. 8 (specifically, fixes the sheet ends 103*a* to 103*d* to the supporting base 120). Since the sheet fixing member 160 fixes all the sheet ends 103*a* to 103*d* of the bottom surface sheet 103, the movement of the lifting 510 that occurs in the bottom surface sheet 103 can be more positively regulated. That is, by fixing substantially the entire circumference of all the sheet ends 103*a* to 103*d* of the bottom surface sheet 103 by the sheet fixing member 160, the movement of the lifting 510 can be more positively regulated.

Additionally, since the terminal portions 132 of the power supply 130 are hidden by the sheet fixing member 160, the risks of an operator and the like touching the terminal portions 132 of the power supply 130, and a foreign matter and the like entering inside the power supply unit 190-3 can be reduced. Note that, although the member for fixing the sheet ends of the bottom surface sheet 103 and the member for hiding the terminal portions 132 of the power supply 130 are integrally constructed in the sheet fixing member 160, these members may be separately constructed. In addition, when separately constructed, the material of each of the members may be different, and the members may be constructed by a sheet and a molded part. On this occasion, the sheet fixing member 160 can be made thinner when constructed by a sheet. In addition, the sheet fixing member 160 is provided with a communication hole 162 through which the FFC 104 for connecting the substrate 150 in the power supply unit 190-3 to the substrate 170 passes. Note that, although the bottom surface sheet 103 is not fixed in the area of the communication hole 162 of the sheet fixing member 160, it is not necessary to fix the entire areas of the sheet ends, as long as the effect of the aspect of the embodiments is obtained.

As described above, in the imaging apparatus 100 and the power supply unit 190-3 according to the third embodiment, the sheet ends 103*a* to 103*d* of the bottom surface sheet 103 (insulating sheet) are fixed by the sheet fixing member 160. According to such a configuration, the imaging apparatus 100 and the power supply unit 190 that have further even less damage to the wire connecting portions 141 between the terminal portions 132 of the power supply 130 and the lead wires 140, while reducing the thickness, can be provided.

Fourth Embodiment

In a fourth embodiment, the shape of the sheet fixing member 160 that fixes the sheet ends of the bottom surface sheet 103 is different from those in the first embodiment to the third embodiment.

Figure 9:
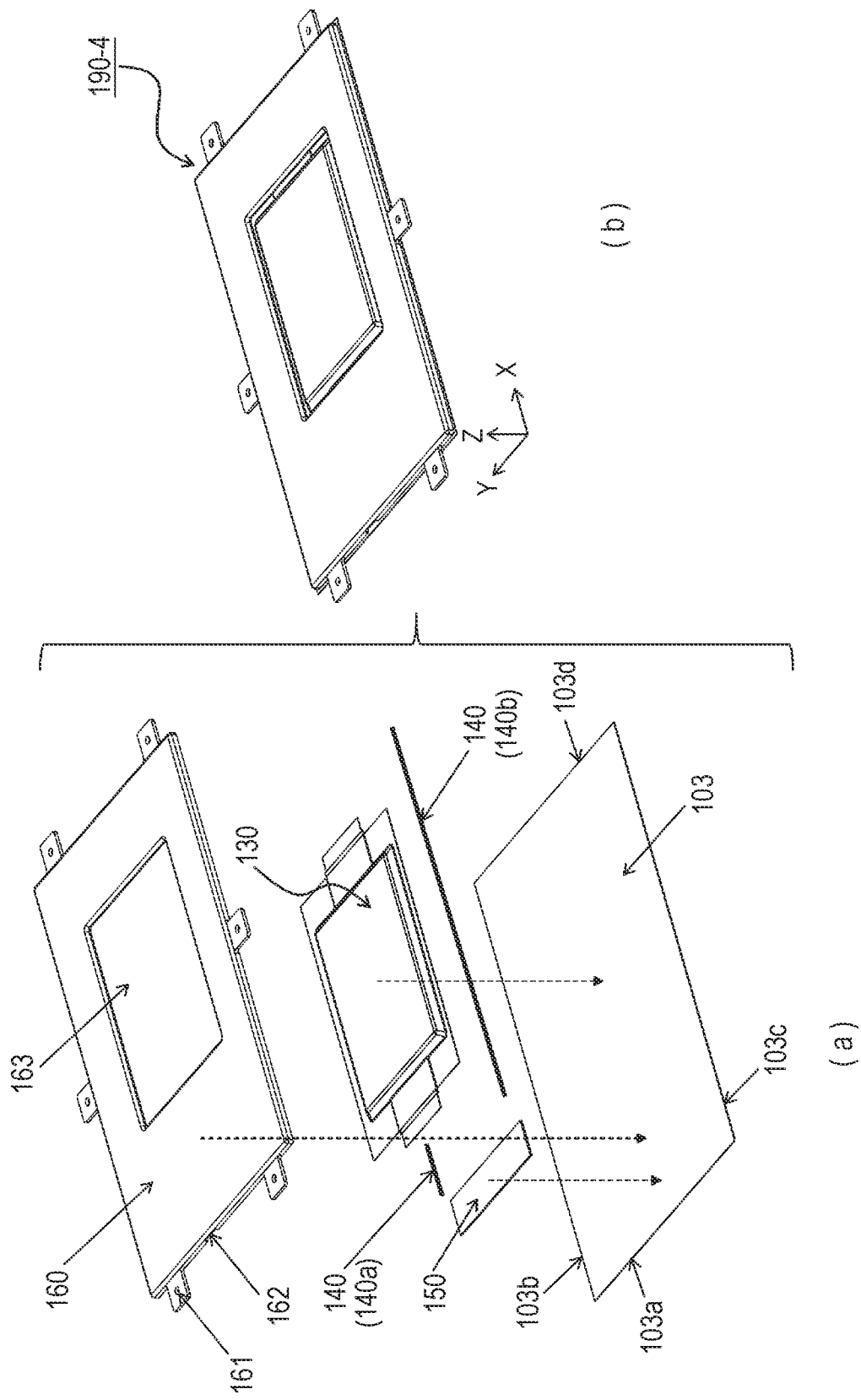
FIG. 9 illustrates a perspective view and an exploded view of a power supply unit according to a fourth embodiment.

FIG. 9 is a diagram illustrating an example of the schematic configuration of the power supply unit 190 according to the fourth embodiment of the disclosure. Additionally, in the following description, the power supply unit 190 according to the fourth embodiment illustrated in (b) of FIG. 9 will be written as "the power supply unit 190-4".

In the power supply unit 190-4, the sheet fixing member 160 is provided with an opening 163 in the area corresponding to at least the body portion 131 of the power supply 130 (the area of a part of the sheet fixing member 160). In contrast to the power supply unit 190-3 illustrated in (b) of FIG. 8, the power supply unit 190-4 is provided with the opening 163 in the area of the sheet fixing member 160 corresponding to at least the body portion 131 of the power supply 130. This opening 163 is arranged in at least a part of the area of the power supply 130 when seen from the direction (the Z direction) perpendicular to the surface of the bottom surface sheet 103.

Figure 10:
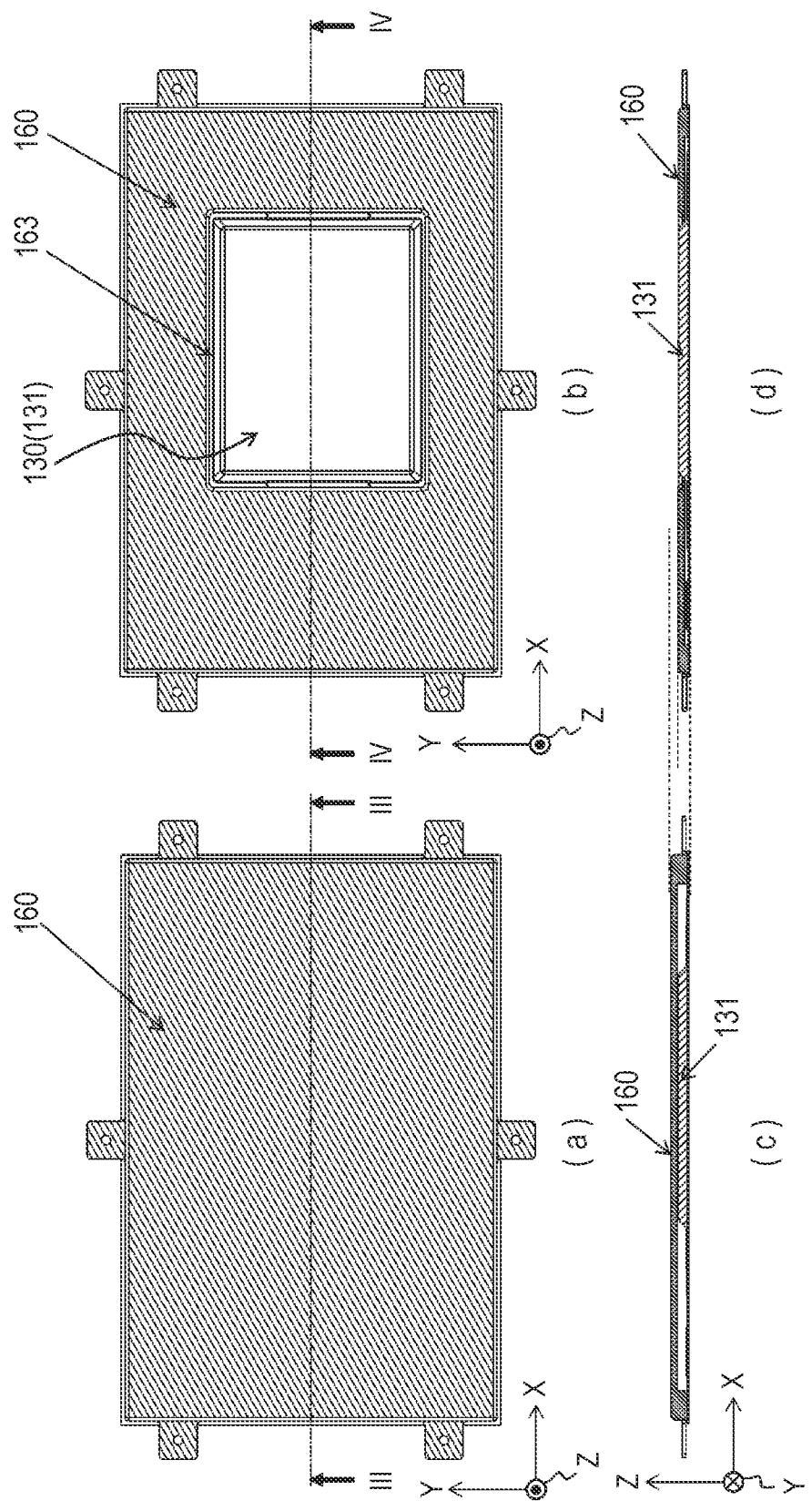
FIG. 10 illustrates front views and cross-sectional views of a sheet fixing member according to a fourth embodiment.

FIG. 10 is a diagram illustrating the case where the opening 163 is provided in the sheet fixing member 160, and the case where the opening 163 is not provided.

(a) of FIG. 10 is, for example, a diagram of the power supply unit 190-3 according to the third embodiment illustrated in (b) of FIG. 8 seen from a −Z direction, and (b) of FIG. 10 is, for example, a diagram of the power supply unit 190-4 according to the fourth embodiment illustrated in (b) of FIG. 9 seen from the −Z direction.

Further, (c) of FIG. 10 is a diagram illustrating an example of the internal configuration of the power supply unit 190-3 according to the third embodiment at the III-III cross-section illustrated in (a) of FIG. 10. Additionally, (d) of FIG. 10 is a diagram illustrating an example of the internal configuration of the power supply unit 190-4 according to the fourth embodiment at the IV-IV cross-section illustrated in (b) of FIG. 10.

As illustrated in (d) of FIG. 10, the power supply unit 190-4 can be made thinner by providing the opening 163 of the sheet fixing member 160 in the area corresponding to the body portion 131 in which the thickness of the power supply 130 is greatest.

According to the imaging apparatus 100 and the power supply unit 190-4 according to the fourth embodiment, similar to the above-described third embodiment, the imaging apparatus 100 and the power supply unit 190 that have further even less damage to the wire connecting portions 141 between the terminal portions 132 of the power supply 130 and the lead wires 140, while reducing the thickness, can be provided.

Fifth Embodiment

In a fifth embodiment, the number of the power supply 130, and the shape of the sheet fixing member 160 that fixes the sheet ends of the bottom surface sheet 103 are different from those in the first embodiment to the fourth embodiment.

Figure 11:
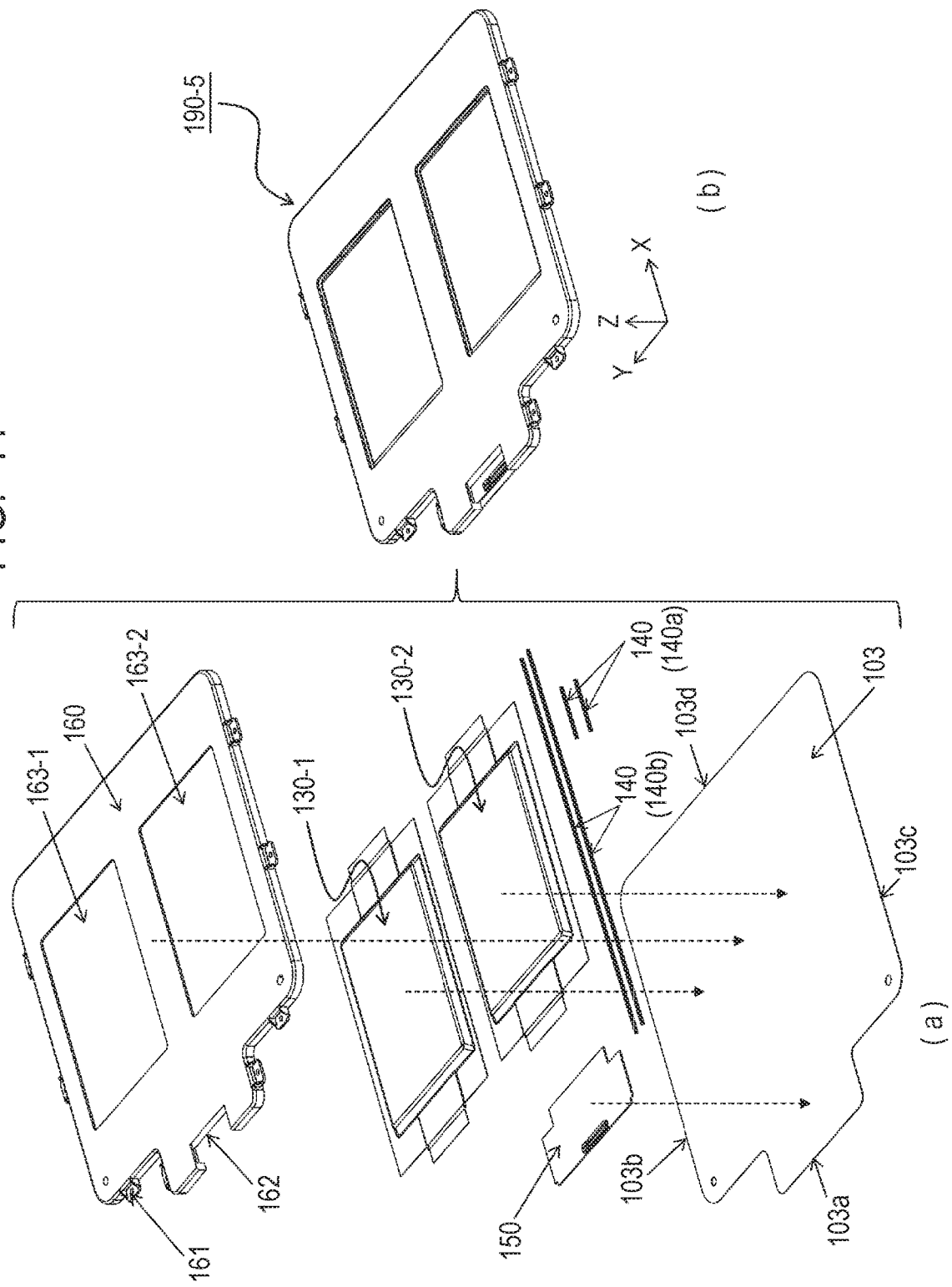
FIG. 11 illustrates a perspective view and an exploded view of a power supply unit according to a fifth embodiment.

FIG. 11 is a diagram illustrating an example of the schematic configuration of the power supply unit 190 according to the fifth embodiment of the disclosure. In the following description, the power supply unit 190 according to the fifth embodiment illustrated in (b) of FIG. 10 will be written as "the power supply unit 190-5".

In the power supply unit 190-5 according to the fifth embodiment, as illustrated in (a) of FIG. 11, a plurality of power supplies 130-1 and 130-2 are provided. Then, corresponding to these plurality of power supplies 130-1 and 130-2, the power supply unit 190-5 is provided with a plurality of lead wires 140a and 140b, and a plurality of openings 163-1 and 163-2 in the sheet fixing member 160. Here, in the sheet fixing member 160, the opening 163-1 is provided in the area corresponding to the body portion 131 of the power supply 130-1, and the opening 163-2 is provided in the area corresponding to the body portion 131 of the power supply 130-2.

In the power supply unit 190-5, the plurality of power supplies 130-1 and 130-2 are connected in parallel or in series, and either may be applied. Note that the bottom surface sheet 103 and the sheet fixing member 160 do not necessarily need to be square, and it is important for the sheet fixing member 160 to fix the sheet ends 103a to 103d of the bottom surface sheet 103 within the scope in which the effect of the aspect of the embodiments is obtained.

According to the imaging apparatus 100 and the power supply unit 190-5 according to the fifth embodiment, the imaging apparatus 100 and the power supply unit 190 that have further even less damage to the wire connecting portions 141 between the terminal portions 132 of the power supply 130 and the lead wires 140, while reducing the thickness, can be provided.

Sixth Embodiment

Figure 12:
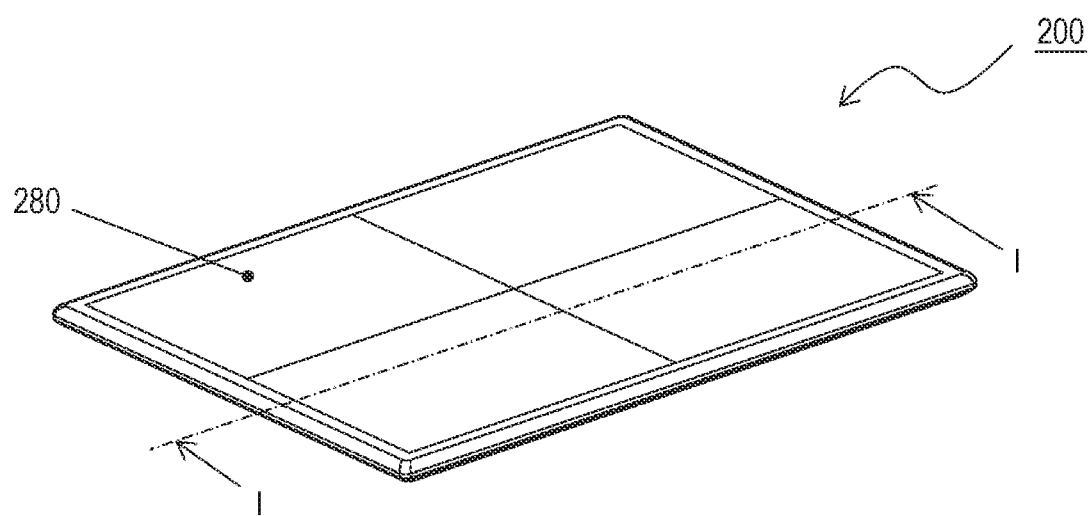
FIG. 12 is an external perspective view of a radiation imaging apparatus according to a sixth embodiment.

FIG. 12 is a perspective view illustrating the external appearance of an imaging apparatus 200 according to a sixth embodiment of the disclosure.

Figure 13:
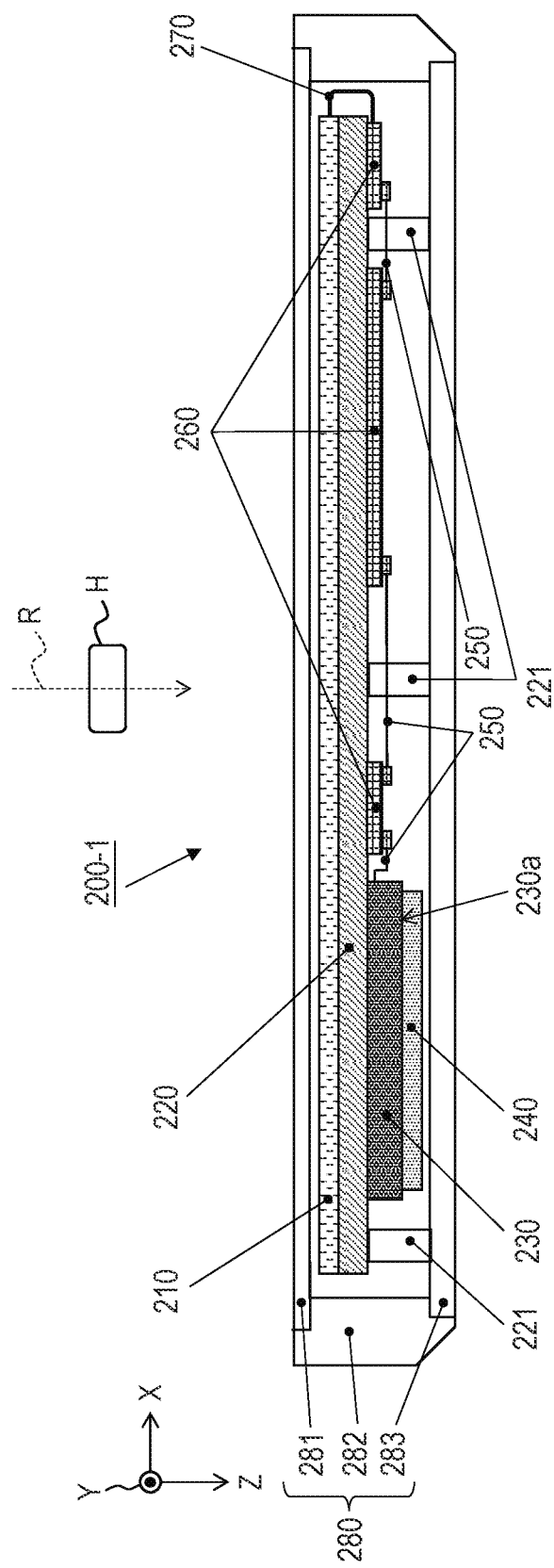
FIG. 13 is a cross-sectional view at the I-I cross-section illustrated in FIG. 12.

FIG. 13 is a diagram illustrating an example of the internal configuration of the imaging apparatus 200 at the I-I cross-section illustrated in FIG. 12. In the following description, this imaging apparatus 200 illustrated in this FIG. 13 will be written as "the imaging apparatus 200-1".

The imaging apparatus 200-1 is configured by including a detecting panel 210, a support member 220 with legs 221, a capacitor 230, a protection member 240, wires 250, electric boards 260, a flexible circuit board 270, and a housing 280.

It is assumed that an area of the detecting panel 210 on which a photoelectric conversion element is arranged is a detecting surface, and an area where a plurality of photoelectric conversion elements are arranged in the area of the detecting surface is a pixel area. Note that, in the detecting panel 210, a conversion element directly converting the incident radiation R into the radiation image signal may be used instead of the above-described photoelectric conversion elements and a phosphor, and in that case, the surface on which the conversion element is arranged serves as the detecting surface, and the area where the plurality of conversion elements are arranged serves as the pixel area.

In the support member 220, the plurality of legs 221 are arranged on the surface on the opposite side of the surface supporting the detecting panel 210, and spaces are formed between the support member 220 and the housing 280 (specifically, a rear lid housing portion 283) by these plurality of legs 221. Then, the capacitor 230, the protection member 240, the wires 250, the electric boards 260, etc. are arranged in the spaces formed by the plurality of legs 221.

The capacitor 230 is a power supply apparatus for supplying electric power to the detecting panel 210, the electric boards 260, the flexible circuit board 270, etc., and is a configuration portion that can perform charging and discharging in a shorter period of time than a battery. In FIG. 13, the surface of the capacitor 230 on which the protection member 240 is arranged is illustrated as a surface 230a.

The protection member 240 is arranged in the area between the capacitor 230 and the housing 280 (specifically, the rear lid housing portion 283), and where other structures do not intervene, and is a configuration portion formed by an elastic body. From viewpoints of weight reduction and shock absorption, the protection member 240 can be formed of a foam body with a closed-cell, open-cell or semi-open cell structure having the 25% compressive stress of 0.005 MPa or more and 0.25 MPa or less. Here, the 25% compressive stress refers to the load (stress) required for an object to be compressed by 25%. In the case where the 25% compressive stress of the protection member 140 is less than 0.005 MPa or larger than 0.25 MPa, when a local shock is applied from the outside, the shock load cannot be sufficiently distributed, and a local weight is applied to the capacitor 230, which may lead to damage to the capacitor 230 itself or the lamination of the capacitor 230.

By arranging the protection member 240, even when the housing 280 is deformed due to falling, collision and vibration of the imaging apparatus 200-1, the contact between the capacitor 230 and the housing 280 can be prevented. That is, when the housing 280 receives a shock, the influence of the shock on the capacitor 230 can be reduced. Additionally, the shock from the outside can be distributed and mitigated by forming the protection member 240 with an elastic body, and as a result, the capacitor 230 can be protected.

The wires 250 are wires for electrical connection between the capacitor 230 and the electric board 260, between the electric boards 260, etc.

The electric boards 260 include an electric board for controlling the operation of the detecting panel 210, an electric board for reading the radiation image signal that is an electric signal converted by the detecting panel 210, an electric board that generates the image data of a radiation image after reading the radiation image signal, etc.

The flexible circuit board 270 is a circuit board that electrically connects the detecting panel 210 to the electric board 260. Specifically, one end of the flexible circuit board 270 is connected to the detecting panel 210, and the other end is connected to the electric board 260 for processing the radiation image signal obtained by the detecting panel 210.

The housing 280 contains the detecting panel 210, the support member 220, the capacitor 230, the protection member 240, the wires 250, the electric boards 260, and the flexible circuit board 270. The housing 280 includes an incident side housing portion 281, a frame housing portion 282, and the rear lid housing portion 283.

The incident side housing portion 281 is a portion located on the side on which the radiation R is incident. The frame housing portion 282 is a portion located on side surfaces. The rear lid housing portion 283 is a portion located on the opposite side on the incident side housing portion 281.

Note that a part or all of the incident side housing portion 281, the frame housing portion 282, and the rear lid housing portions 283 may be integrated.

The incident side housing portion 281 includes a material whose absorption rate of the radiation R is lower than that of the frame housing portion 282 and the rear lid housing portion 283. Additionally, a resin material, a CFRP (carbon fiber reinforced plastic), etc. that is light in weight, and can ensure a certain strength against a shock, etc. is used for the incident side housing portion 281. A material having a low specific gravity, such as magnesium, aluminum or CFRP, is used for the frame housing portion 282 and the rear lid housing portion 283 for ensuring the strength against falling, shock, etc., and for reducing the weight in order to reduce the burden at the time of transportation. Additionally, in order to improve the electromagnetic shielding capabilities of the imaging apparatus 200-1, a metal material with conductivity, such as magnesium and aluminum, is used for the frame housing portion 282 and the rear lid housing portion 283. Here, the electromagnetic shielding capabilities refers to the capability to shield the imaging apparatus 200-1 from electromagnetic waves generated by an external electric instrument, etc., and the capability to shield electromagnetic waves generated by the imaging apparatus 200-1 to the outside of the housing 280.

Figure 14:
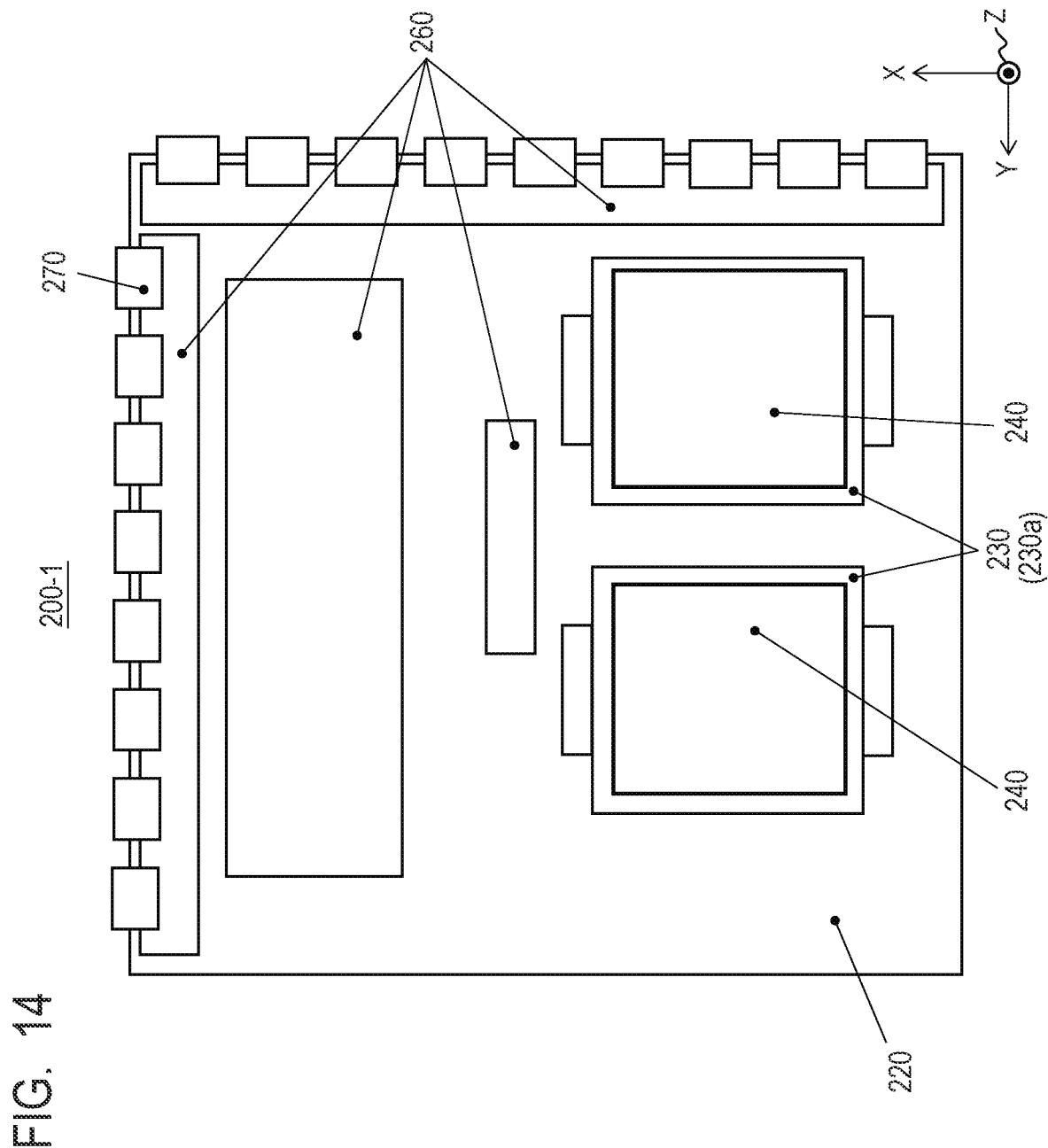
FIG. 14 is a schematic diagram illustrating the internal structure of the radiation imaging apparatus according to the sixth embodiment seen from a rear surface side.

FIG. 14 is a diagram illustrating an arrangement example of the internal configuration of the imaging apparatus 200 according to the sixth embodiment of the disclosure seen from the rear lid housing portion 283 side illustrated in FIG. 13.

Although the aspect in which two capacitors 230 are arranged in the imaging apparatus 200-1 is illustrated, one or more capacitors 230 may be arranged. Additionally, the protection member 240 has a thickness of 0.5 mm to 3.5 mm in order to be stored inside the thin imaging apparatus 200-1. Further, when the protection member 240 is too thin, the protection member 240 cannot absorb a shock, and conversely, when the protection member 240 is thick, the protection member 240 may interfere with the housing 280 (rear lid housing portion 283) to affect the outer shape of the imaging apparatus 200-1. Therefore, the thickness can be 1.0 mm to 2.5 mm. When the protection member 240 is enlarged in the plane direction (the XY plane direction) of the surface 230a of the capacitor, both the volume and the weight are increased. In order to reduce the weight, in one embodiment, the density of the protection member 140 is 1000 kg/m$^3$ or less, and in another embodiment the density of the protection member 140 is 500 kg/m$^3$ or less.

Here, the mechanism of contact between the capacitor 230 and the housing 280, and the role of the protection member 240 will be described. As illustrated in FIG. 13, since the spaces exist between the support member 220 and the rear lid housing portion 283 by the legs 221, when a shock is applied to the imaging apparatus 200-1, the rear lid housing portion 283 and the support member 220 may be bent and deformed. Especially, in the vicinity of the capacitor 230 having a large area in the plane direction, since the interval between the legs 221 becomes large, the deformation of the rear lid housing portion 283 and the support member 220 become larger, and the rear lid housing portion 283 and the capacitor 230 contact easily. The protection member 240 suppresses damage to the lamination of the capacitor 230 caused by the contact between the rear lid housing portion 283 and the capacitor 230 due to such deformation. In addition, the protection member 240 may be arranged in the area between the capacitor 230 and the housing 280, and where other structures do not intervene. From viewpoints of the ease of determination of the arrangement portion, the prevention of displacement of the protection member 240 in the plane direction, etc., the protection member 240 can be, for example, bonded to and arranged on the capacitor 230.

As described above, according to the sixth embodiment, the capacitor 230 can be protected when the housing 280 receives a shock.

Seventh Embodiment

While in the sixth embodiment, the number of the protection members 240 bonded to and arranged on one capacitor 230 is one, in the seventh embodiment, the number of the protection members 240 bonded to and arranged on one capacitor 230 is plural.

Figure 15:
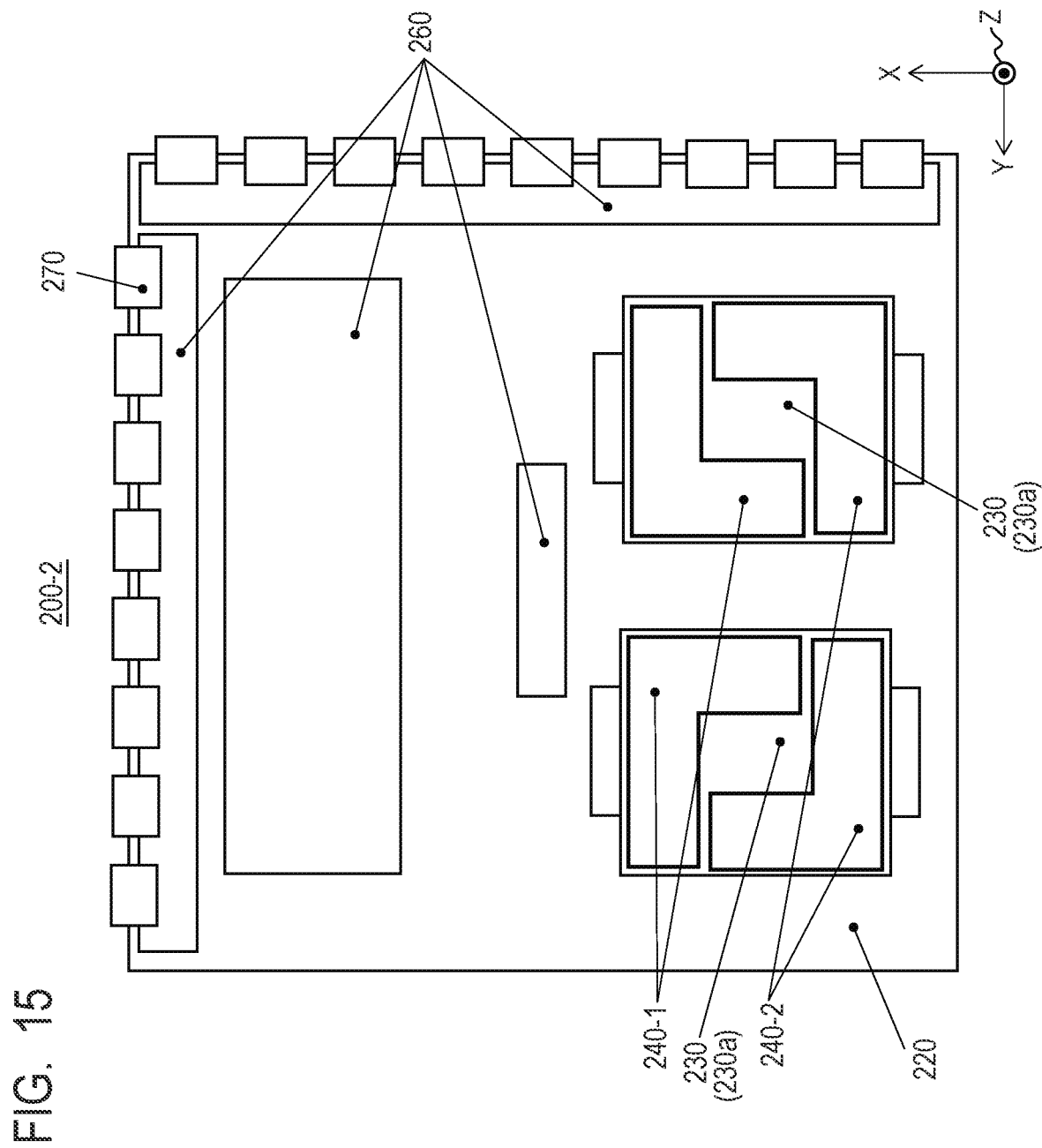
FIG. 15 is a schematic diagram illustrating the internal structure of a radiation imaging apparatus according to a seventh embodiment seen from a rear surface side.

FIG. 15 is a diagram illustrating an arrangement example of the internal configuration of the imaging apparatus 200 according to a seventh embodiment of the disclosure seen from the rear lid housing portion 283 side illustrated in FIG. 13. Additionally, in the following description, this imaging apparatus 200 according to the seventh embodiment illustrated in FIG. 15 will be written as "the imaging apparatus 200-2".

In the imaging apparatus 200-2, an example is illustrated in which the number of the protection members 240 bonded to and arranged on one capacitor 230 is two. A first protection member 240-1 and a second protection member 240-2 are bonded to and arranged along the surface 130a of the capacitor 230, so as not to overlap with each other. Accordingly, compared to the case where the capacitor 230 is covered with the protection member 240 having a large area, the weight of the protection member 240 can be reduced. Note that the respective materials of the protection members may all be the same, or may be different. For example, the relationship between the first protection member 240-1 arranged on the center side in the planar direction (the XY plane direction) of the imaging apparatus 200-2, and the second protection member 240-2 arranged on the outer side in terms of the 25% compressive stress may be the first protection member 240-1<the second protection member 240-2. Accordingly, when a load is applied from the outside, the local load produced in the capacitor 230 can be suppressed in the center side where the rear lid housing portion 283 of the housing 280 is relatively greatly displaced.

Eighth Embodiment

Figure 16:
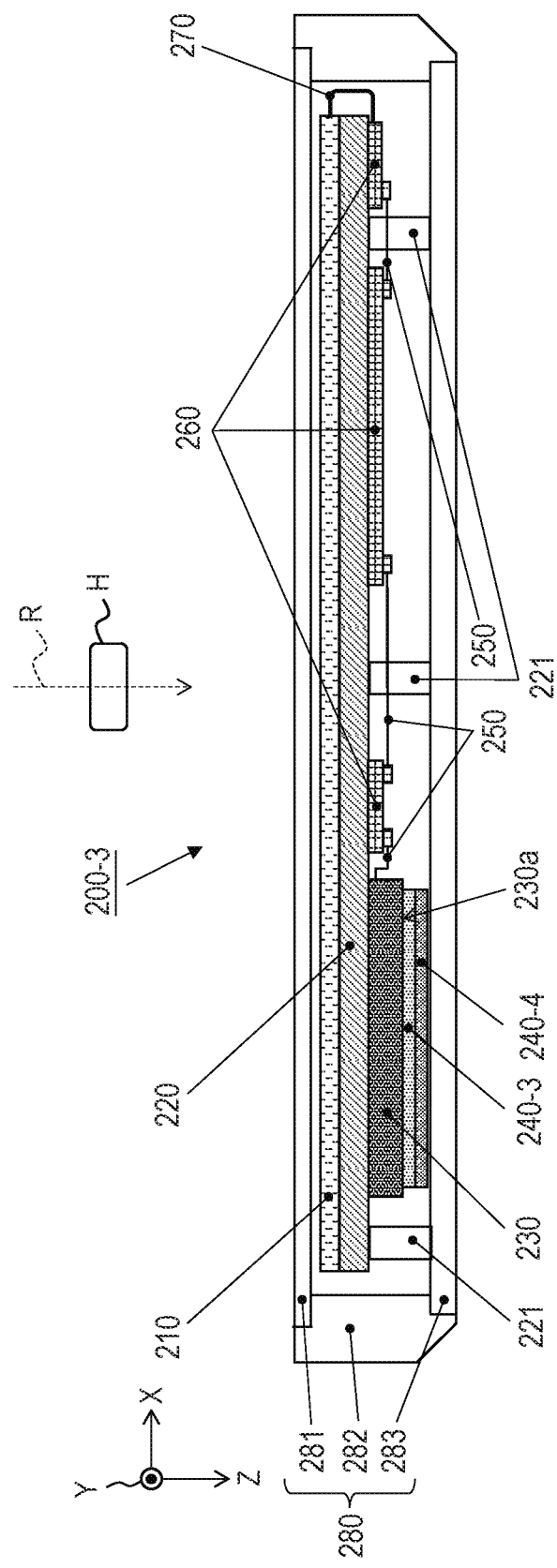
FIG. 16 is a cross-sectional view of a radiation imaging apparatus according to an eighth embodiment.

FIG. 16 is a diagram illustrating an example of the internal configuration of the imaging apparatus 200 according to an eighth embodiment of the disclosure at the I-I cross-section illustrated in FIG. 12. Note that, in the following description, this imaging apparatus 200 according to the eighth embodiment illustrated in FIG. 16 will be written as "the imaging apparatus 200-3".

In the imaging apparatus 200-3, a first protection member 240-3 and a second protection member 240-4 are laminated and arranged between the capacitor 230 and the rear lid housing portion 283. Here, the relationship between the first protection member 240-3 and the second protection member 240-4 in terms of the 25% compressive stress or hardness can be the first protection member 240-3<second protection member 240-4. Accordingly, the capability to distribute the load can be improved especially for the local load from the rear lid housing portion 283 side, and the local load can be suppressed from being applied to the capacitor 230.

Ninth Embodiment

Figure 17A:
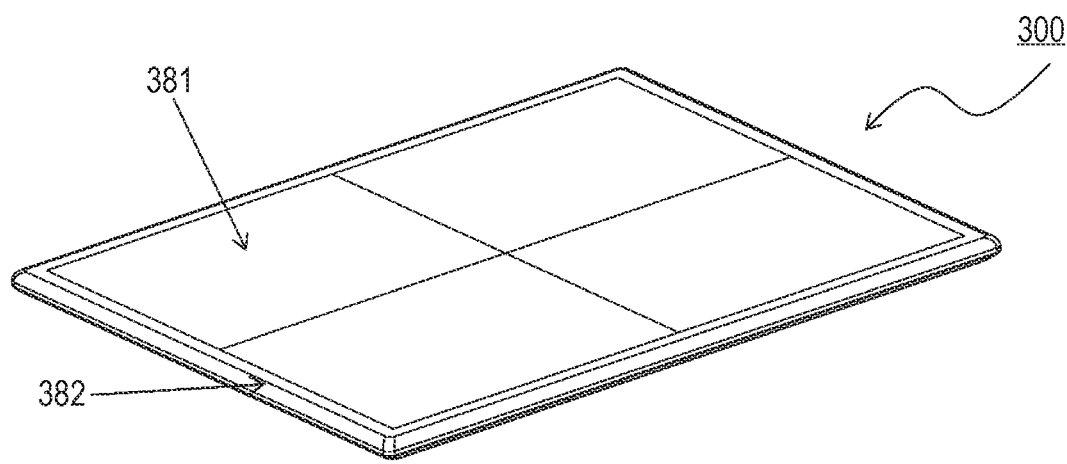
FIG. 17A and FIG. 17B are external perspective views of a radiation imaging apparatus according to a ninth embodiment.
Figure 17B:
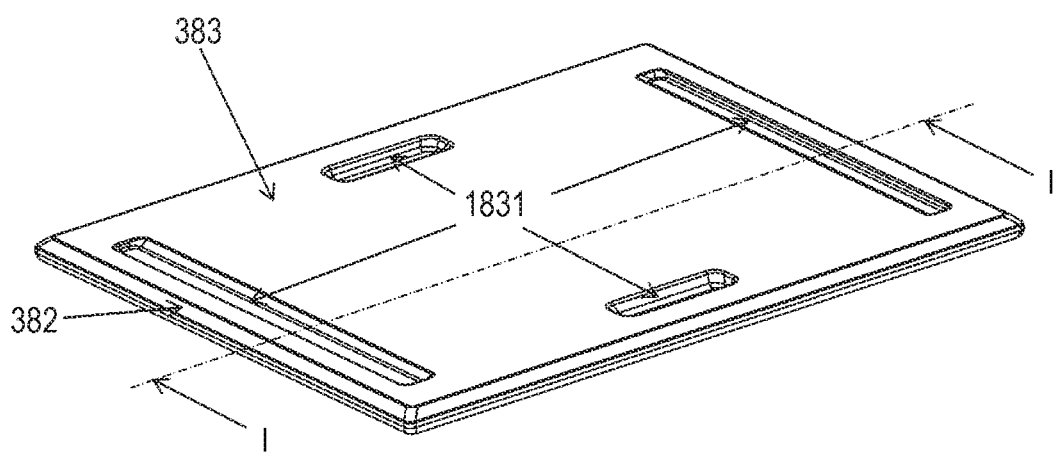

FIG. 17A and FIG. 17B are external perspective views of an imaging apparatus 300 according to a ninth embodiment of the disclosure. FIG. 17A is a diagram seen from the side of an incident surface 381 on which radiation is incident, and FIG. 17B is a diagram seen from the side of a rear surface 383 located on the opposite side of the incident surface 381. The incident surface 381 and the rear surface 383 are connected by side surfaces 382. Further, concave portions 1831 that are concave toward the inside of the imaging apparatus 300 are formed in the rear surface 383 for improvement of the portability of the imaging apparatus 300.

Figure 18:
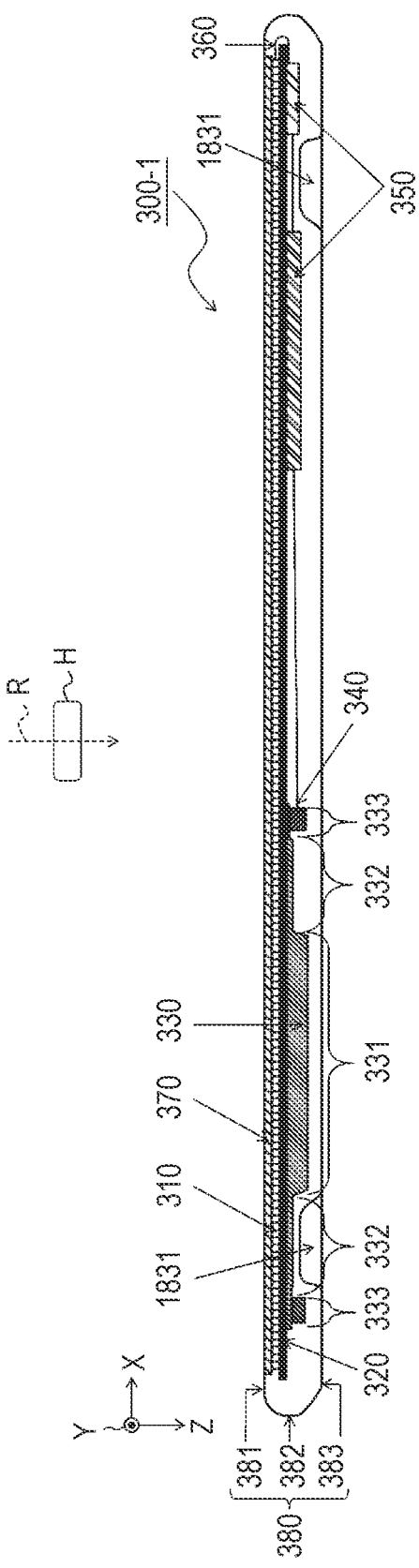
FIG. 18 is a cross-sectional view at the I-I cross-section illustrated in FIG. 17B.

FIG. 18 is a diagram illustrating an example of the internal configuration of the imaging apparatus 300 at the I-I cross-section illustrated in FIG. 17B. In the following description, this imaging apparatus 300 according to the ninth embodiment illustrated in FIG. 18 will be written as "the imaging apparatus 300-1".

Although the volume of the internal space of a housing 380 of the imaging apparatus 300-1 is limited, in order to supply sufficient electric power, the volume of a capacitor 330 is also required, and the mounting volume of the capacitor 330 becomes greater due to the existence of sealing portions 332, terminal portions 333, etc. On the other hand, when the concave portions 1831 are formed in the housing 380 for improvement of the portability (operativity) of the imaging apparatus 300-1, the limited volume inside the housing 380 will be further decreased. Thus, it is necessary to utilize the internal space of the housing 380 more efficiently. Therefore, in the ninth embodiment, as illustrated in FIG. 18, at least a part of the concave portions 1831 is formed to overlap with the body portion 331 of the capacitor 330 when seen from the direction (the X direction) perpendicular to the incident direction (the Z direction) of the radiation R. Further, at least a part of the sealing portions 332 of the capacitor 330 is arranged between the concave portion 1831 (more specifically, a portion of the concave portion 1831 that is most concave toward the detecting panel 310) and the detecting panel 310 in the incident direction. Accordingly, the capacitor 330 supplying sufficient electric power can be efficiently arranged in the limited space inside the housing 380, while maintaining improvement in the portability of the imaging apparatus 300-1.

Additionally, since the terminal portions 333 of the capacitor 330 are connected to connecting wires 340 such as lead wires with screws, solder, etc., the terminal portions 333 require spaces. In the ninth embodiment, at least one terminal portion 333 (the terminal portion 333 located on the left end in FIG. 18) of the capacitor 330 is arranged on the outer side than the concave portion 1831 in the imaging apparatus 300-1 when seen from the incident direction. In addition, the body portion 331 of the capacitor 330 is arranged on the opposite side of the at least one terminal portion 333 (the terminal portion 333 located on the left end in FIG. 18) by sandwiching the concave portion 1831 between the body portion 331 and the at least one terminal portion 333, when seen from the incident direction. With this arrangement configuration, when an external force (shock) is applied to the imaging apparatus 300-1, since the terminal portion 333 arranged on the outer side in the housing 380 is arranged at the position between the side surface 382 and the concave portion 1831 of the housing 380, the terminal portion 333 is arranged at the location where deformation of the housing 380 is little. Therefore, the structure in which the terminal portion 333 can be easily protected against an external force (shock) is achieved.

A buffering member 370 is arranged between the incident surface 381 of the housing 380 and the detecting panel 310, and protects the detecting panel 310 from an external force, etc. This buffering member 370 can include, for example, a foam resin, or a gel.

The housing 380 includes the incident surface 381, the side surfaces 382 and the rear surface 383. The concave portion 1831 that is concave toward the capacitor 330 is formed in the rear surface 383. The deeper the concave portion 1831 is concave toward the detecting panel 310, the more stable the handling by the operator will be, and the more the rigidity of the housing 380 will also be improved. However, the deeper the concave, the more the volume inside the imaging apparatus 300-1 will be decreased.

Figure 19:
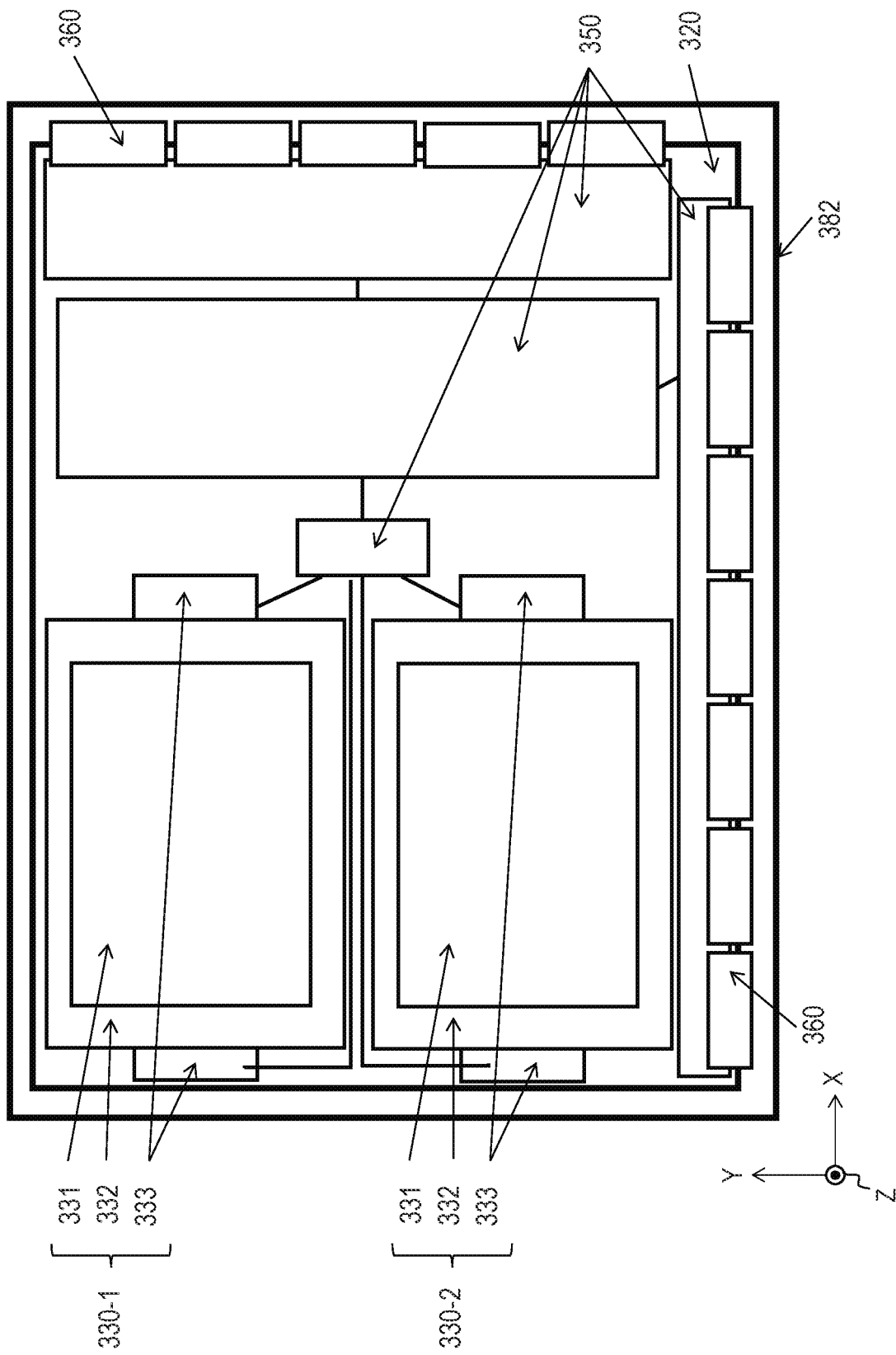
FIG. 19 is a schematic diagram illustrating the internal structure of the radiation imaging apparatus according to the ninth embodiment seen from a rear surface side.

FIG. 19 is a diagram illustrating an example of the internal configuration of the imaging apparatus 300-1 seen from the rear surface 383 side.

The imaging apparatus 300-1 includes a plurality of capacitors 330 arranged along the direction (the Y direction) perpendicular to the incident direction (the Z direction). Two capacitors 330, a first capacitor 330-1 and a second capacitor 330-2, are arranged substantially in parallel as the plurality of capacitors 330 when seen from the incident direction. When seen from the incident direction, the concave portion 1831 will be formed at the position that overlaps with both the first capacitors 330-1 and the second capacitors 330-2. On this occasion, the concave portion 1831 may be formed to be long in the Y direction, so as to overlap with the two capacitors 330. In the example illustrated in FIG. 17B, some of the concave portions 1831 are arranged to be long along the outer edges of the imaging apparatus 300 in such a manner. By forming the concave portions 1831 to be long in such a manner, the spaces gripped by the operator can be made wider, leading to an improvement in the handling. Note that the concave portions 1831 may be formed in a continuous loop along the outer edges of the imaging apparatus 300 when seen from the incident direction.

Additionally, in FIG. 19, similar to FIG. 18, the capacitors 330, electric boards 350 and flexible circuit boards 360 are arranged along the X direction, and these are arranged on a supporting base 320.

Each of the plurality of capacitors 330 is arranged so as to avoid the electric boards 350. Especially, when the plurality of capacitors 330 are arranged so as to be aligned on an outer side that is substantially symmetrical with the electric board 350 connected to the flexible circuit boards 360, the capacitors 330 having large volumes can be easily arranged. Two capacitors 330 are arranged in order to ensure the electric capacity required for the imaging apparatus 300-1. In this case, considering that the concave portions 1831 illustrated in FIG. 18 are gripped by a human hand, the concave portions 1831 can be within 20 mm to 100 mm from the side surface 382 of the housing 380 when seen from the incident direction. However, since the capacitor 330 is thickest in the body portion 331, in the case where the body portion 331 and the concave portion 1831 are arranged to overlap with each other when seen from the incident direction, it is difficult to form the concave portion 1831 deeply. On the other hand, when the concave portion 1831 is formed in the vicinity of the side surface 382 so as not to overlap with the capacitor 330, since the operator is to greatly bend the joints of fingers, etc. for gripping, it is generally harder to grip, and may compromise the portability. Additionally, in order to arrange the capacitors 330 closer to the center, the sizes of the electric boards 350 and the capacitors 330 are to be reduced.

In the ninth embodiment, in order to solve such a problem, as illustrated in FIG. 18, at least a part of the concave portion 1831 is formed so as to overlap with the body portion 331 when seen from the direction (the X direction) perpendicular to the incident direction. Additionally, at least a part of the sealing portion 332 is arranged between the concave portion 1831 and the detecting panel 310 in the incident direction (arranged so as to overlap with the concave portion 1831 when seen from the incident direction). Since the sealing portion 332 is thinner than the body portion 331, the deep concave portion 1831 can be formed. In this case, since the concave portion 1831 will be arranged between the body portion 331 and the terminal portion 333, the concave portion 1831 can be provide at the position that does not compromise the portability.

Tenth Embodiment

In the tenth embodiment, the shape of the concave portion 1831 provided in the housing 380 is different from that in the ninth embodiment.

Figure 20:
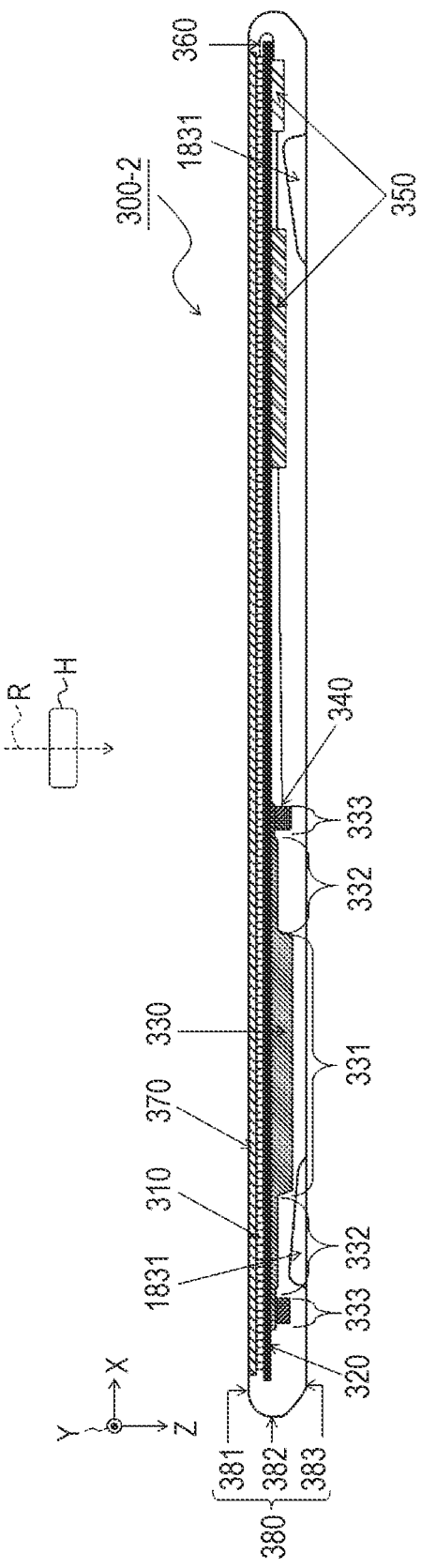
FIG. 20 is a cross-sectional view of a radiation imaging apparatus according to a tenth embodiment.

FIG. 20 is a diagram illustrating an example of the internal configuration of the imaging apparatus 300 according to the tenth embodiment at the I-I cross-section illustrated in FIG. 17B. In the following description, this imaging apparatus 300 according to the tenth embodiment illustrated in FIG. 20 will be written as "the imaging apparatus 300-2".

In the imaging apparatus 300-2, the bottom of the concave portion 1831 is shaped to be inclined in an XZ plane. Also in the imaging apparatus 300-2, similar to the imaging apparatus 300-1 according to the ninth embodiment, at least a part of the concave portion 1831 is formed so as to overlap with the body portion 331 of the capacitor 330 when seen from the direction (the X direction) perpendicular to the incident direction. Further, at least a part of the sealing portion 332 is arranged between the concave portion 1831 and the detecting panel 310 in the incident direction (arranged so as to overlap with the concave portion 1831 when seen from the incident direction). Accordingly, the deep concave portion 1831 can be formed.

Eleventh Embodiment

Figure 21:
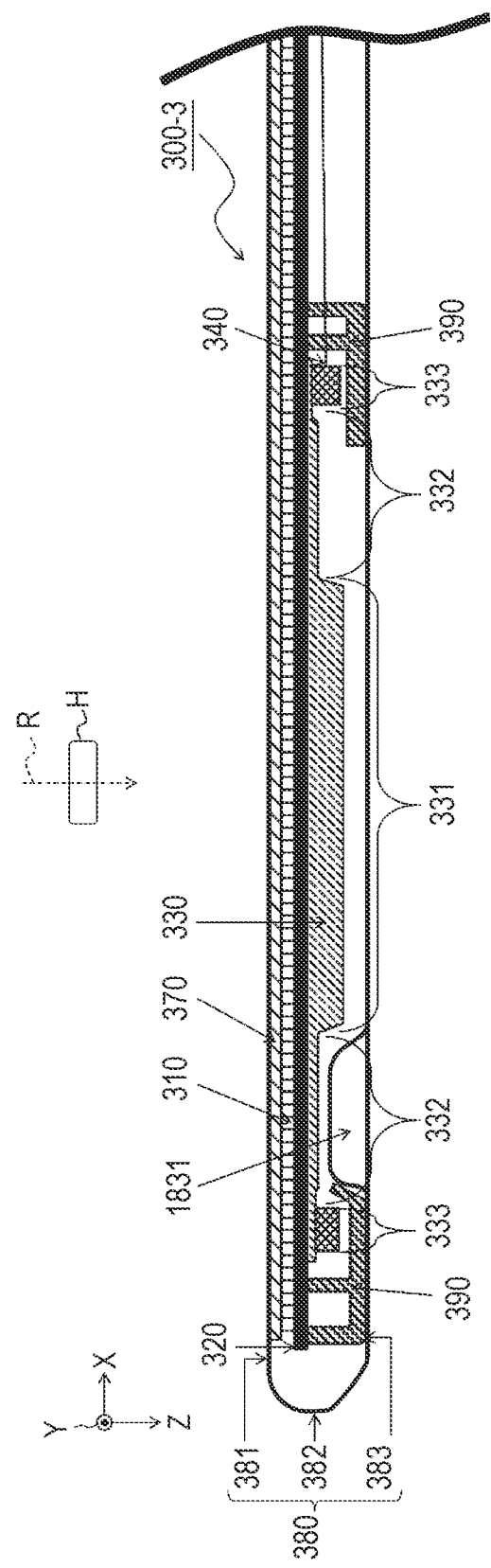
FIG. 21 is a cross-sectional view of a radiation imaging apparatus according to an eleventh embodiment.

FIG. 21 is a diagram illustrating an example of the internal configuration of the imaging apparatus 300 according to the tenth embodiment at the I-I cross-section illustrated in FIG. 17B. Note that, in this FIG. 21, only a part of the area (the area around the concave portion 1831 and the capacitor 330 of the housing 380, corresponding to about the left half of that illustrated in FIG. 18) at the I-I cross-section illustrated in FIG. 17B is illustrated. In the following description, this imaging apparatus 300 according to the tenth embodiment illustrated in FIG. 21 will be written as "the imaging apparatus 300-3".

In contrast to the imaging apparatus 300-1 according to the ninth embodiment, in the imaging apparatus 300-3, a protection member 390 is further provided between the capacitor 330 and the rear surface of the housing 380 mainly in the incident direction. Here, the protection member 390 can be formed with a material having insulation properties (an insulating material), such as a resin and a fiber-reinforced resin. Note that the imaging apparatus 300-3 also includes the electric boards 350 and the flexible circuit boards 360 illustrated in FIG. 18.

Also in the imaging apparatus 300-3, similar to the ninth embodiment, at least a part of the concave portion 1831 is formed so as to overlap with the body portion 331 of the capacitor 330 when seen from the direction (the X direction) perpendicular to the incident direction. Additionally, at least a part of the sealing portion 332 is arranged between the concave portion 1831 and the detecting panel 310 in the incident direction (arranged so as to overlap with the concave portion 1831 when seen from the incident direction).

Here, when the imaging apparatus 300-3 is dropped or subjected to an external force, the housing 380 is deformed, the distance between the terminal portions 333 of the capacitor 330 and the rear surface 383 of the housing 380 is decreased, and it is conceivable that protection of the terminal portions 333 may become insufficient. Therefore, in an eleventh embodiment, as illustrated in FIG. 21, the protection members 390 for protecting the capacitor 330 are arranged between the concave portion 1831 and the terminal portions 333, and between the rear surface 383 of the housing 380 and the terminal portions 333, so as to cover at least a part of the terminal portions 333. Further, in a part of the surroundings of the terminal portions 333, the protection members 390 are arranged as the spacers that fill the gaps between the supporting base 320 and the housings 380 in the incident direction (the Z direction) of the radiation R. On this occasion, the protection member 390 may have the structure of a spacer that supports the housing 380 with the supporting base 320 when the housing 380 is deformed. In this manner, by arranging the protection member 390 as the spacer between the supporting base 320 and the housing 380, even when the housing 380 is deformed by an external force, etc., the risk of the terminal portions 333 of the capacitor 330 contacting the housing 380 can be reduced.

Additionally, the protection member 390 may have the structure that covers not only the terminal portions 333 of the capacitor 330, but also covers the sealing portions 332, the body portion 331, etc. of the capacitor 330. In addition, the housing 380 may be formed from a fiber-reinforced resin, a magnesium alloy, an aluminum alloy, etc. with strength. When the material of the housing 380 has conductivity, an insulating layer may be provided in order to stably ensure insulation with the capacitor 330. Additionally, the supporting base 320 may also be similarly formed from a fiber-reinforced resin, a magnesium alloy, an aluminum alloy, etc.

Other Embodiment

Figure 22:
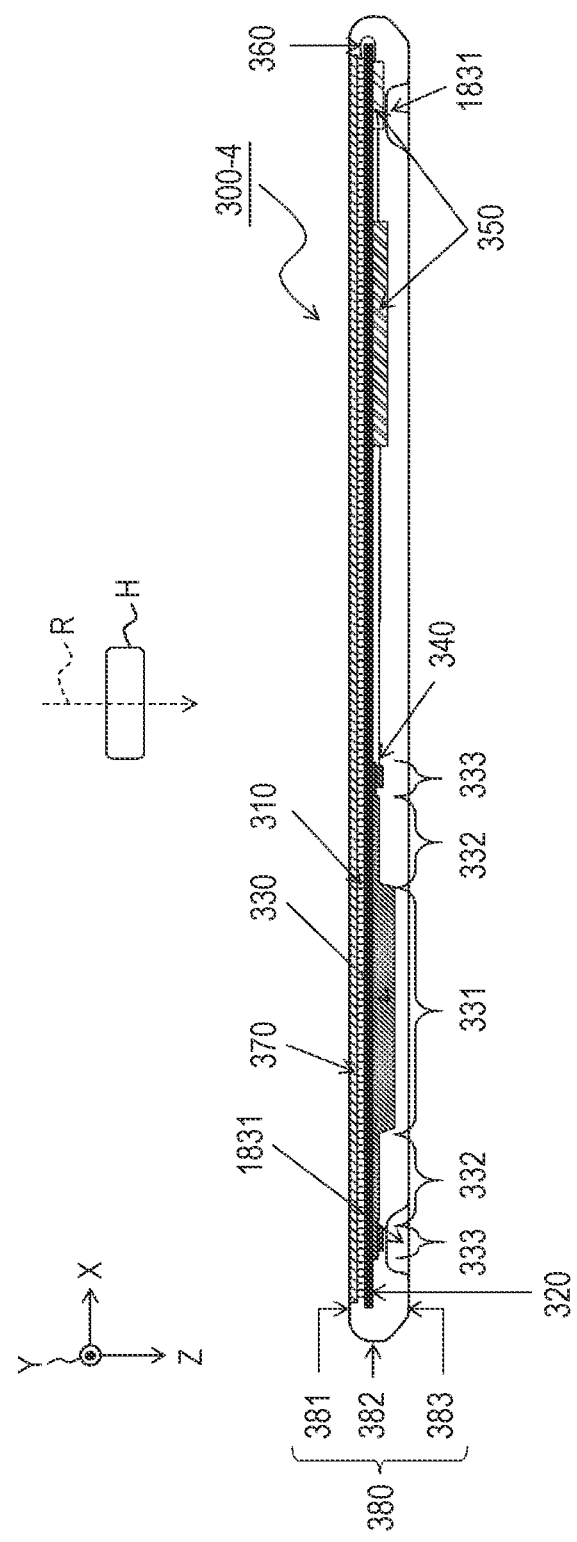
FIG. 22 is a cross-sectional view of a radiation imaging apparatus according to another embodiment.

As in an imaging apparatus 300-4 illustrated in FIG. 22, the sealing portion 332 may not be arranged between the concave portion 1831 and the detecting panel 310 in the incident direction, and at least a part of the terminal portion 333 may be arranged between the concave portion 1831 and the detecting panel 310.

According to the above-described first to eleventh embodiments of the disclosure, the radiation imaging apparatus and the power supply unit that have less damage to the connecting portions between the terminal portions of the power supply and the wires, while reducing the thickness, can be provided.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-236296, filed Dec. 26, 2019, Japanese Patent Application No. 2019-236389, filed Dec. 26, 2019, and Japanese Patent Application No. 2019-236302, filed Dec. 26, 2019, which are hereby incorporated by reference herein in their entirety.

What is claimed is:

1. A radiation detecting apparatus comprising:
a panel arranged to detect incident radiation;
a capacitor arranged to supply electric power to the panel; and
a housing arranged to contain the panel and the capacitor, wherein the housing has a top portion positioned on a side where the radiation is incident, a bottom portion positioned opposite the top portion, and a side portion that connects the top portion and the bottom portion,
wherein the capacitor includes a body portion on which an electrode is laminated, and a sealing portion arranged to seal surroundings of the body portion,
wherein the housing has a concave portion in the bottom portion for gripping the radiation detecting apparatus, concaved toward the panel,
wherein an inner surface of at least a part of the concave portion is closer to the panel than a bottom side surface of the capacitor, and
wherein at least a part of the sealing portion and the inner surface of the part of the concave portion face each other with a gap between them.

2. The radiation detecting apparatus according to claim 1, further comprising a plurality of terminal portions, at least one of the plurality of terminal portions is arranged on an outer side than the concave portion of the radiation imaging apparatus when seen from the incident direction of the radiation, and the body portion is arranged on the opposite side of the at least one terminal portion with the concave portion between the body portion and the at least one terminal portion.

3. The radiation detecting apparatus according to claim 1, further comprising a protection member between the capacitor and the housing in the incident direction of the radiation.

4. The radiation detecting apparatus according to claim 3, wherein the protection member has a 25% compressive stress of 0.005 MPa or more and 0.25 MPa or less.

5. The radiation detecting apparatus according to claim 3, wherein the protection member is formed by a foam body having a cell structure of a closed-cell, open-cell or semi-open-cell.

6. The radiation detecting apparatus according to claim 3, wherein the protection member is arranged in a part or all of an area between the capacitor and the housing, and where no other structure intervenes.

7. The radiation detecting apparatus according to claim 3, wherein a plurality of protection members is arranged as the protection member along a surface of the capacitor facing a side in which the protection member is arranged.

8. The radiation detecting apparatus according to claim 3, wherein a plurality of protection members is laminated and arranged between the capacitor and the housing as the protection member.

9. The radiation detecting apparatus according to claim 3, wherein the protection member has a thickness of approximately 3.5 mm or less.

10. The radiation detecting apparatus according to claim 9, wherein the protection member has a thickness of approximately 2.5 mm or less.

11. The radiation detecting apparatus according to claim 9, wherein the protection member has a thickness of approximately 0.5 mm or more.

12. The radiation detecting apparatus according to claim 11, wherein the protection member has a thickness of approximately 1.0 mm or more.

13. The radiation detecting apparatus according to claim 3, wherein the protection member has a density of approximately 1000 kg/m$^3$ or less.

14. The radiation detecting apparatus according to claim 3, further comprising:
a supporting base arranged to support the panel,
wherein the protection member is arranged as a spacer between the supporting base and the housing in the incident direction of the radiation.

15. The radiation detecting apparatus according to claim 1,
wherein the capacitor comprises a plurality of capacitors arranged along a direction perpendicular to the incident direction of the radiation, and
wherein the concave portion is formed at a position that overlaps with a plurality of sealing portions corresponding to the plurality of capacitors when seen from a predetermined position in the incident direction of the radiation.

16. The radiation detecting apparatus according to claim 1, wherein the concave portion is near a predetermined point on the side portion, and there is a clearance between the predetermined point and the concave portion, and a length of the clearance is approximately 20 mm or more.

17. The radiation detecting apparatus according to claim 1, wherein the housing has a plurality of concave portions at least including the concave portion.

18. The radiation detecting apparatus according to claim 1, wherein the concave portion is shaped to go around the outer circumference of the bottom portion.

19. The radiation detecting apparatus according to claim 1, wherein a depth of the concave portion becomes shallower from the outer circumference of the bottom portion to the inner region of the bottom portion.

20. The radiation detecting apparatus according to claim 1, wherein the capacitor is a lithium-ion capacitor or an electric double-layer capacitor.

* * * * *